US012644730B2

(12) United States Patent (10) Patent No.: US 12,644,730 B2

Ueda et al. (45) Date of Patent: Jun. 2, 2026

(54) ABSOLUTE POSITION DETECTION DEVICE AND ABSOLUTE POSITION DETECTION METHOD

(71) Applicant: Mitsubishi Electric Corporation, Tokyo (JP)

(72) Inventors: Yusuke Ueda, Tokyo (JP); Yoshinao Tatei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 184 days.

(21) Appl. No.: 18/723,482

(22) PCT Filed: Feb. 4, 2022

(86) PCT No.: PCT/JP2022/004435

§ 371 (c)(1),
(2) Date: Jun. 24, 2024

(87) PCT Pub. No.: WO2023/148923

PCT Pub. Date: Aug. 10, 2023

(65) Prior Publication Data

US 2025/0052597 A1     Feb. 13, 2025

(51) Int. Cl.
*G01D 5/347* (2006.01)
*G01D 5/245* (2006.01)

(52) U.S. Cl.
CPC ....... *G01D 5/2455* (2013.01); *G01D 5/34746* (2013.01); *G01D 2205/18* (2021.05)

(58) Field of Classification Search
CPC ............. G01D 5/2455; G01D 5/34746; G01D 2205/18
See application file for complete search history.

(56) References Cited

U.S. PATENT DOCUMENTS 5,606,256 A  *  2/1997  Takei ................... A47G 1/0616
                                              318/135

FOREIGN PATENT DOCUMENTS

EP        3588014 A1    1/2020
JP     H05-340426 A    12/1993
(Continued)

OTHER PUBLICATIONS

International Search Report and Written Opinion mailed on Apr. 26, 2022, received for PCT Application PCT/JP2022/004435, filed on Feb. 4, 2022, 8 pages including English Translation.
(Continued)

*Primary Examiner* — Alesa Allgood
(74) *Attorney, Agent, or Firm* — XSENSUS LLP

(57) ABSTRACT

An absolute position detection device includes: a scale unit having a first member and disposed on a mover or a stator; a sensor unit having detection elements disposed at a first interval to detect position correspondence information corresponding to the first member; and a computation unit that: detects a distortion boundary position of output based on a comparison result between the position correspondence information by first and second detection elements; based on element coordinates of either the first or second detection element, element coordinates of a third detection element, the first interval, a length of the output pairs, and the position correspondence information by the third detection element, calculates a position of the third detection element to an end position of the first member; and calculates a positional relationship between the mover and the stator based on the calculated position and a length of the first member.

10 Claims, 15 Drawing Sheets

(56) References Cited

FOREIGN PATENT DOCUMENTS

| | | |
|---|---|---|
| JP | H06-235608 A | 8/1994 |
| JP | 2002-168656 A | 6/2002 |
| JP | 2011-061995 A | 3/2011 |

OTHER PUBLICATIONS

Decision to Grant mailed on Sep. 20, 2022, received for JP Application 2022-541869, 5 pages including English Translation.

* cited by examiner

ABSOLUTE POSITION DETECTION DEVICE AND ABSOLUTE POSITION DETECTION METHOD

CROSS-REFERENCE TO RELATED APPLICATION

This application is a national stage application, pursuant to 35 U.S.C. § 371, of International Patent Application No. PCT/JP2022/004435, filed Feb. 4, 2022, the entire contents of which are incorporated herein by reference.

FIELD

The present disclosure relates to an absolute position detection device and an absolute position detection method for detecting the positional relationship between a mover and a stator.

BACKGROUND

A movement mechanism that moves a mover included in a linear motor or the like detects the positional relationship between the mover and the stator using a position detection device that detects the position of a position detecting member joined to the mover or the stator. As one type of position detection device, there is a device in which a magnet is used as the position detecting member. In a position detection device in which a magnet is used as the position detecting member, detection elements that detect magnetic force are disposed at specific intervals along the movement path of the mover, and the detection elements measure the magnetic intensity of the position detecting member to detect the position of the magnet as the position detecting member.

For example, in the linear motor of Patent Literature 1, table information storing the arrangement coordinates of the detection elements disposed on the base member and table information storing the stroke position corresponding to the magnetic field intensity are registered in advance. In the linear motor of Patent Literature 1, in order to detect the position of the mover, the stroke position corresponding to the magnetic field intensity acquired by the detection elements is added to the arrangement coordinates of the detection elements.

CITATION LIST

Patent Literature

Patent Literature 1: Japanese Patent Application Laid-open No. 2011-061995

SUMMARY OF INVENTION

Problem to be Solved by the Invention

However, in the technique of Patent Literature 1, if the interval at which the detection elements are disposed is wider than a section in which the magnetic field intensity monotonously changes, one magnetic field intensity acquired by the detection elements corresponds to a plurality of stroke positions, and thus the maximum interval at which the detection elements are disposed is limited to a width equal to or less than the section in which the magnetic field intensity monotonously changes. That is, the maximum interval at which the detection elements are disposed is limited to a width equal to or less than the magnetization pitch width of the mover. Therefore, in the technique of Patent Literature 1, it is necessary to dispose the detection elements along the entire movement path of the mover so as not to form a gap that makes the interval at which the detection elements are disposed longer than the magnetization pitch width, which is problematic in that a large number of detection elements are required.

The present disclosure has been made in view of the above, and an object thereof is to obtain an absolute position detection device capable of detecting the positional relationship between a mover and a stator with fewer detection elements.

Means to Solve the Problem

In order to solve the above-described problem and achieve the object, an absolute position detection device according to the present disclosure includes a scale unit having a first member in which output pairs each for performing different outputs are disposed such that the different outputs are alternated, the scale unit being disposed on a mover or a stator. The absolute position detection device according to the present disclosure also includes a sensor unit in which detection element groups each including a plurality of detection elements disposed at a first interval in a moving direction of the scale unit and configured to detect position correspondence information corresponding to a position of the first member are disposed at a second interval in the moving direction of the scale unit. The absolute position detection device according to the present disclosure also includes a computation unit that compares a first value corresponding to the position correspondence information detected by a first detection element of the detection elements with a second value corresponding to the position correspondence information detected by a second detection element adjacent to the first detection element in the detection element group including the first detection element, and detects, based on a comparison result, a distortion boundary position that is a position at which intensity distribution of the outputs starts to deviate in the moving direction. When setting either the first detection element or the second detection element used for detection of the distortion boundary position as a reference detection element, based on first element coordinates that are a position of the reference detection element in the sensor unit, second element coordinates that are a position, in the sensor unit, of a third detection element of the detection elements included in the detection element group including the reference detection element, the first interval, a third interval that is a length of the output pairs in the moving direction, and a third value corresponding to the position correspondence information detected by the third detection element, the computation unit calculates a position of the third detection element with respect to an end position that is a position of an end of the first member in the moving direction. The computation unit also calculates a positional relationship between the mover and the stator based on the position of the third detection element with respect to the end position and a length of the first member in the moving direction.

Effects of the Invention

The absolute position detection device according to the present disclosure can achieve the effect of detecting the positional relationship between the mover and the stator with fewer detection elements.

BRIEF DESCRIPTION OF DRAWINGS

FIG. 1 is a diagram illustrating a configuration of an absolute position detection device according to the first embodiment.

FIG. 4 is a second diagram for explaining the relationship between the scale unit and the magnetic field intensity in the absolute position detection device according to the first embodiment.

FIG. 7 is a first diagram for explaining the relationship between the scale unit and the magnetic field intensity in the absolute position detection device according to the second embodiment.

FIG. 10 is a fourth diagram for explaining the relationship between the scale unit and the magnetic field intensity in the absolute position detection device according to the second embodiment.

FIG. 14 is a diagram illustrating a configuration of the reflector included in the absolute position detection device according to the third embodiment.

DESCRIPTION OF EMBODIMENTS

Figure 2:
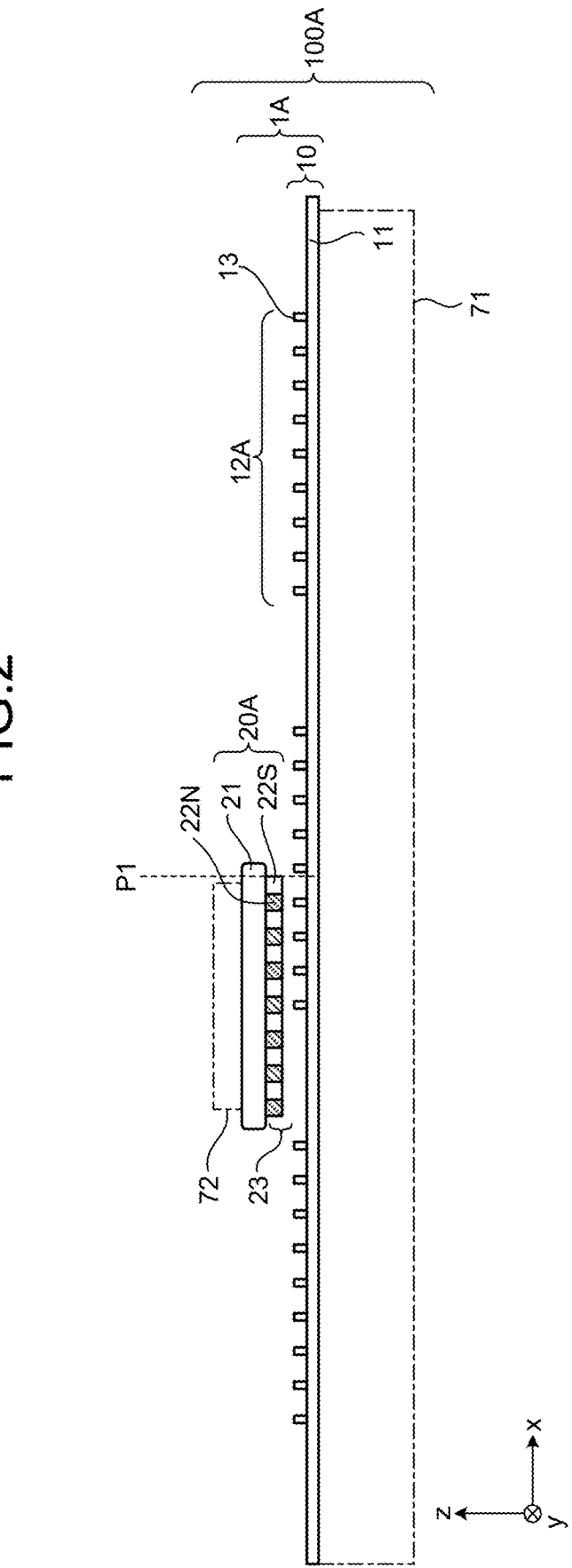
FIG. 2 is a diagram illustrating a configuration of the movement mechanism of the absolute position detection system according to the first embodiment.

Hereinafter, an absolute position detection device and an absolute position detection method according to embodiments of the present disclosure will be described in detail with reference to the drawings.

First Embodiment

Figure 1:
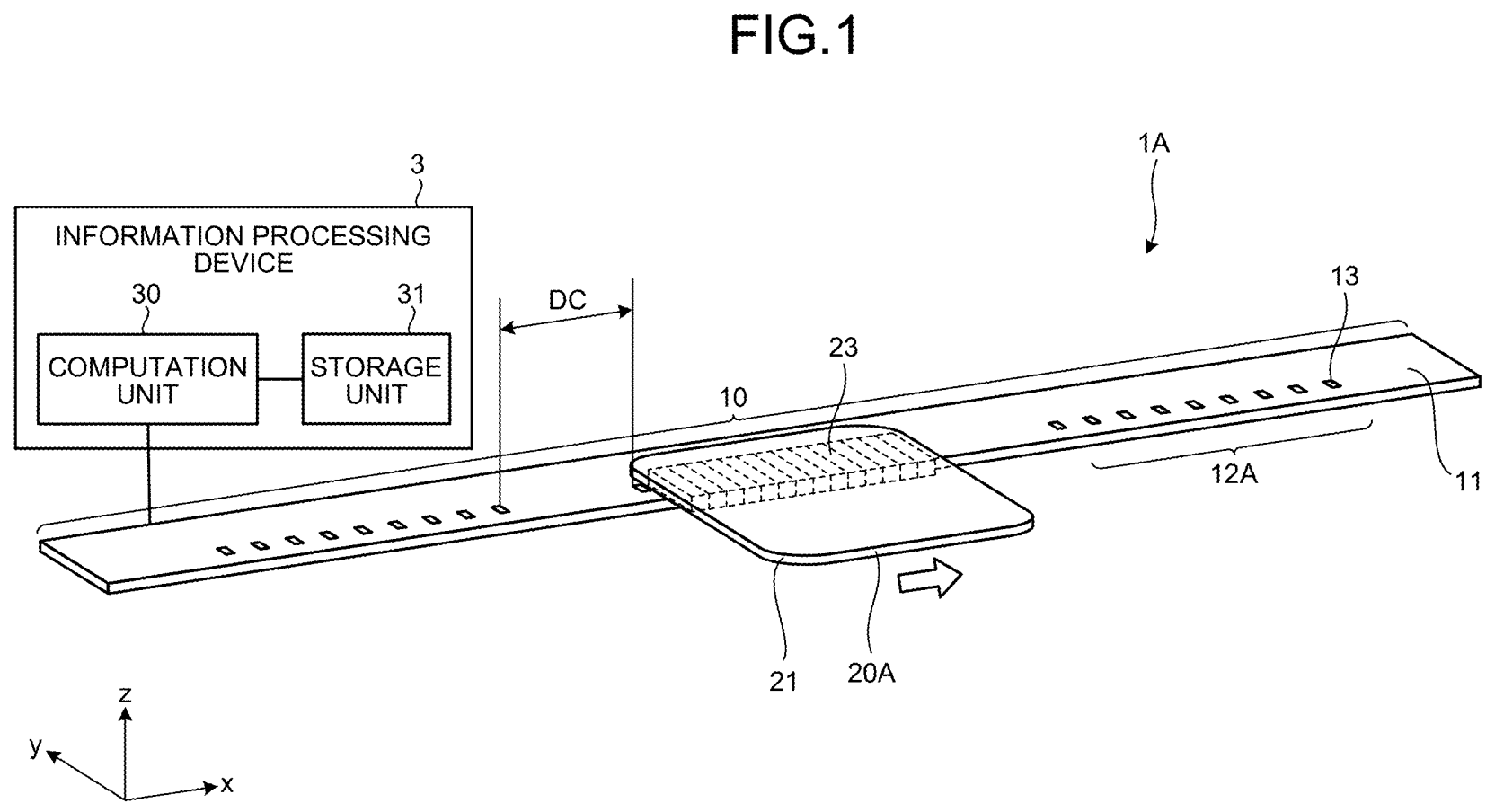

FIG. 1 is a diagram illustrating a configuration of an absolute position detection device according to the first embodiment. FIG. 1 is a perspective view schematically illustrating the structure of the absolute position detection device 1A. An absolute position detection system including the absolute position detection device 1A includes a stator (stator 71 to be described later) and a mover (mover 72 to be described later) as a movement mechanism. The absolute position detection device 1A detects the positional relationship between the mover 72 and the stator 71. Examples of the movement mechanism include a linear motor and a linear track.

The absolute position detection device 1A includes a sensor unit 10, a scale unit 20A, and an information processing device 3. The sensor unit 10 includes a printed circuit board 11 configured using a rectangular plate-like member, and a detection element group 12A consisting of a plurality of Hall elements 13. The sensor unit 10 is connected to the information processing device 3.

The information processing device 3 includes a computation unit 30 and a storage unit 31. The computation unit 30 is connected to the sensor unit 10 and the storage unit 31. The scale unit 20A includes a base material 21 configured using a plate-like member, and a magnet 23 which is a first member for use in position detection.

Hereinafter, two axes orthogonal to each other on a plane parallel to the upper surface of the printed circuit board 11 are referred to as the x axis and the y axis. The axis orthogonal to the x axis and the y axis is referred to as the z axis. The longitudinal direction of the printed circuit board 11 is the x direction, and the lateral direction is the y direction. In addition, the upper surface side of the printed circuit board 11 and the upper surface side of the sensor unit 10 are the plus z direction, and the bottom surface side of the printed circuit board 11 and the bottom surface side of the sensor unit 10 are the minus z direction.

In the absolute position detection device 1A, the sensor unit 10 is fixed, and the scale unit 20A moves with the bottom surface of the scale unit 20A facing the upper surface of the sensor unit 10. Note that, in the absolute position detection device 1A, the scale unit 20A may be fixed, and the sensor unit 10 may move in a state that the sensor unit 10 faces the scale unit 20A.

In the case where the sensor unit 10 is fixed and the scale unit 20A moves, the stator 71 is disposed in the minus z direction, which is the bottom surface side of the sensor unit 10, and the mover 72 is disposed in the plus z direction, which is the upper surface side of the scale unit 20A. In this case, the scale unit 20A moves together with the mover 72.

In the case where the scale unit 20A is fixed and the sensor unit 10 moves, the stator 71 is disposed in the plus z direction, which is the upper surface side of the scale unit 20A, and the mover 72 is disposed in the minus z direction, which is the bottom surface side of the sensor unit 10. In this case, the sensor unit 10 moves together with the mover 72.

In the case where the movement mechanism is a linear track, the stator 71 is disposed, for example, on the bottom surface side of the sensor unit 10, and the mover 72 is disposed on the upper surface side of the scale unit 20A. In the case where the movement mechanism is a linear motor, the stator 71 is disposed, for example, on the upper surface side of the scale unit 20A, and the mover 72 is disposed on the bottom surface side of the sensor unit 10.

The stator 71 and the mover 72 are disposed facing each other, and the mover 72 moves along the stator 71. Hereinafter, a case where the scale unit 20A moves above the sensor unit 10 toward the plus x direction will be described. That is, the mover 72 is disposed on the upper surface side of the scale unit 20A, and the mover 72 moves along the stator 71 disposed on the bottom surface side of the sensor unit 10. The scale unit 20A and the mover 72 are joined and move integrally. Both the sensor unit 10 and the stator 71 are fixed at specific positions.

One detection element group 12A includes a plurality of Hall elements 13. The Hall element 13 is a magnetic force detection element that detects information corresponding to the magnetic field intensity (signal intensity) that depends on the position of the magnet 23. The Hall element 13 sends the detected information corresponding to the magnetic field intensity to the computation unit 30. An example of information corresponding to the magnetic field intensity is information such as a voltage value corresponding to the magnetic field intensity.

Given that a specific Hall element 13 among the Hall elements 13 is a first Hall element (detection element), two Hall elements 13 adjacent to the first Hall element along the x direction in the detection element group 12A including the first Hall element are a second Hall element (detection element) and a third Hall element (detection element).

The Hall elements 13 included in one detection element group 12A are disposed on the upper surface of the printed circuit board 11 at regular intervals along the carriage moving direction, i.e. moving direction (x direction) of the scale unit 20A. On the printed circuit board 11, a plurality of detection element groups 12A are disposed at specific intervals. An inter-group distance DC, which is the interval between the detection element group 12A and the detection element group 12A adjacent to each other on the printed circuit board 11, is equal to or less than the x-directional dimension of the magnet 23 included in the scale unit 20A. In addition, the inter-group distance DC is longer than the distance between adjacent Hall elements 13 in one detection element group 12A. The interval at which Hall elements 13 are disposed is a first interval, and the interval at which detection element groups 12A are disposed is a second interval.

The magnet 23 included in the scale unit 20A is disposed on the bottom surface of the base material 21. The magnet 23 includes a plurality of N-pole magnets and a plurality of S-pole magnets alternately arranged in the x direction. That is, the magnet 23 includes a plurality of magnetized pairs each consisting of an N pole and an S pole paired. The N-pole magnet and the S-pole magnet are magnets that perform different outputs. In the magnet 23, the magnetized pairs each for performing different outputs are disposed such that the different outputs are alternated. Magnet length, which is the length of the magnet 23 in the x direction, is assumed to be known. Note that a magnetized pair is an example of an output pair.

The storage unit 31 stores the magnet length. The storage unit 31 also stores the threshold (hereinafter may be referred to as the first threshold) of the sum of squares to be described later. The storage unit 31 also stores the threshold (hereinafter may be referred to as the second threshold) of the incremental difference to be described later. The storage unit 31 also stores the threshold (hereinafter may be referred to as the third threshold) of the function selection to be described later. The storage unit 31 also stores the value of the length from the actual end (hereinafter may be referred to as the magnet end) of the magnet 23 to the boundary line (boundary position) of magnetic field distortion in the magnet 23 to be described later. The storage unit 31 also stores the inter-group distance DC and the inter-element distance DA and the magnetization pitch DB to be described later. Furthermore, the storage unit 31 stores the coordinates of each Hall element 13. Here, examples of the coordinates of the Hall elements 13 include information on the number of detection element groups 12A disposed on the printed circuit board 11, the number information allocated to each of the plurality of detection element groups 12A, information on the number of Hall elements 13 constituting the detection element group 12A, and the number information allocated to each of the plurality of Hall elements 13 in the detection element group 12A.

The computation unit 30 calculates positional information of the Hall element 13 with respect to the scale unit 20A based on the information sent from the Hall element 13. The positional information of the Hall element 13 with respect to the scale unit 20A is information corresponding to the positional relationship between the mover 72 and the stator 71.

The positional information calculated by the computation unit 30 is the magnetic field intensity in each Hall element 13 or the incremental position corresponding to the magnetic field intensity. Upon receiving information such as a voltage value corresponding to the magnetic field intensity, the computation unit 30 calculates the magnetic field intensity based on this information and calculates the incremental position based on the magnetic field intensity.

Note that each Hall element 13 may detect the magnetic field intensity. In this case, the computation unit 30 acquires the magnetic field intensity from each Hall element 13 without calculating the magnetic field intensity. Alternatively, each Hall element 13 may detect the incremental position. In this case, the computation unit 30 acquires the incremental position from each Hall element 13 without calculating the incremental position.

The positional information at the first Hall element calculated by the computation unit 30 based on the information corresponding to the magnetic field intensity detected by the first Hall element is first positional information (first value). The positional information at the second Hall element calculated by the computation unit 30 based on the information corresponding to the magnetic field intensity detected by the second Hall element is second positional information (second value). Further, the positional information at the third Hall element calculated by the computation unit 30 based on the information corresponding to the magnetic field intensity detected by the third Hall element is third positional information (third value). In addition, the computation unit 30 calculates the sum of squares of the magnetic field intensity in the Hall element 13.

The incremental position is a position after movement relative to the movement start position as a starting point. The incremental position is used in a movement mechanism of incremental position command type, that is, relative address type. The incremental position does not need to be held in the storage unit 31 even when the power supply of the movement mechanism is off.

The computation unit 30 according to the first embodiment detects a pair of Hall elements 13 (inter-element space between Hall elements 13) at which the difference (for example, incremental difference) in positional information between adjacent Hall elements 13 is equal to or greater than a specific value (second threshold). The computation unit 30 sets one Hall element 13 of the detected pair of Hall elements 13 as a reference Hall element. At the time when the pair of Hall elements 13 is detected, the computation unit 30 receives information corresponding to the magnetic field intensity from other Hall elements 13 detecting information corresponding to the magnetic field intensity in the detection element group 12A in which the reference Hall element is included. Then, the computation unit 30 calculates the positional relationship between the mover 72 and the stator 71, that is, the positional information of the Hall element 13 with respect to the scale unit 20A, based on the information corresponding to the magnetic field intensity received from each of the Hall elements 13.

Note that the information processing device 3 may be configured as a part of the sensor unit 10 or may be configured independently of the sensor unit 10.

FIG. 2 is a diagram illustrating a configuration of the movement mechanism of the absolute position detection system according to the first embodiment. FIG. 2 is a side view of the absolute position detection system 100A. In FIG. 2, the information processing device 3 is not illustrated. In FIG. 2, the right direction is the plus x direction, and the left direction is the minus x direction. As illustrated in FIG. 2, the stator 71 is disposed on the bottom surface side of the sensor unit 10, and the mover 72 is disposed on the upper surface side of the scale unit 20A.

The absolute position detection system 100A includes the absolute position detection device 1A and the movement mechanism. The movement mechanism of the absolute position detection system 100A includes the stator 71 and the mover 72. In the magnet 23, N-pole magnets 22N and S-pole magnets 22S are alternately disposed in the x direction.

Figure 3:
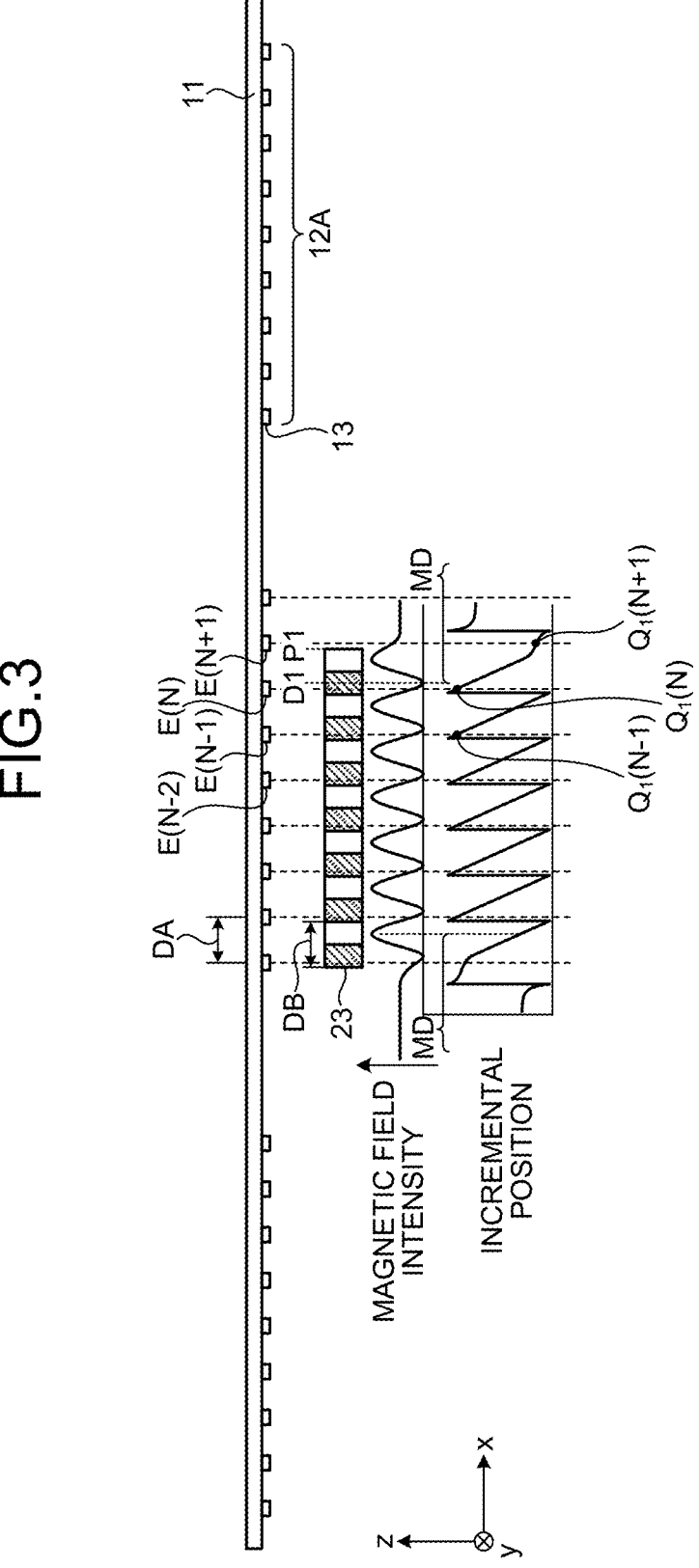
FIG. 3 is a first diagram for explaining the relationship between the scale unit and the magnetic field intensity in the absolute position detection device according to the first embodiment.
Figure 4:
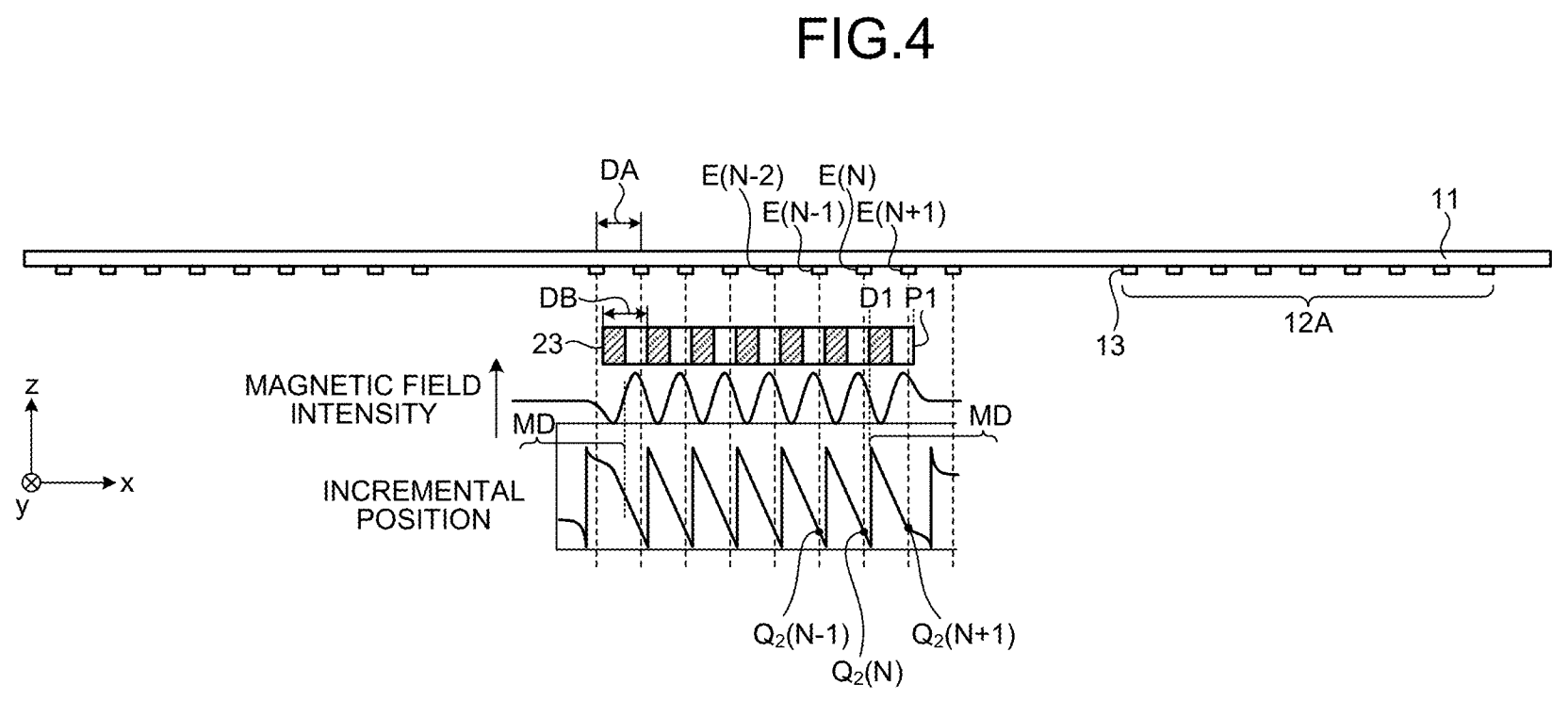

FIG. 3 is a first diagram for explaining the relationship between the scale unit and the magnetic field intensity in the absolute position detection device according to the first embodiment. FIG. 4 is a second diagram for explaining the relationship between the scale unit and the magnetic field intensity in the absolute position detection device according to the first embodiment. FIGS. 3 and 4 are side views of the printed circuit board 11 and the magnet 23. In FIGS. 3 and 4, the magnet 23 is illustrated on the lower side of the printed circuit board 11 for convenience of explanation, but the magnet 23 moves on the upper side of the printed circuit board 11. FIGS. 3 and 4 illustrate the magnetic field intensity of the magnetic force generated by the scale unit 20A. In FIGS. 3 and 4, the right direction is the plus x direction, and the left direction is the minus x direction.

Each Hall element 13 detects information corresponding to the magnetic field intensity that depends on the position of the scale unit 20A, and sends the information corresponding to the magnetic field intensity to the computation unit 30. The computation unit 30 calculates positional information (incremental position or magnetic field intensity) at each Hall element 13 based on the information sent from each Hall element 13.

Hereinafter, the length in the x direction of one magnetized pair consisting of one N-pole magnet 22N and one S-pole magnet 22S is referred to as the magnetization pitch DB. The magnetization pitch DB corresponds to the periodic width of the incremental position that periodically appears. The magnetization pitch DB corresponds to an example of a third interval.

In addition, the distance between adjacent Hall elements 13 in one detection element group 12A is referred to as the inter-element distance DA. That is, the interval at which Hall elements 13 are disposed is the inter-element distance DA.

In the first embodiment, a case where the magnetization pitch DB, which is the periodic width of the incremental position corresponding to the magnetic field intensity, and the inter-element distance DA are the same length as each other will be described.

The magnet 23 outputs the magnetic force detected by the sensor unit 10. The magnetic force output by the magnet 23 can be detected by the Hall element 13 at a position facing the magnet 23 among the Hall elements 13. In the first embodiment, the magnetic force output by the magnet 23 is position correspondence information, i.e. information corresponding to the position of the magnet 23.

As the scale unit 20A including the base material 21 and the magnet 23 disposed on the bottom surface of the base material 21 moves in the plus x direction, the Hall element 13 facing the magnet 23 in the z direction detects information corresponding to the magnetic field intensity. Each Hall element 13 can detect information corresponding to the magnetic field intensity while the magnet 23 is passing, and becomes unable to detect information corresponding to the magnetic field intensity once the magnet 23 finishes passing.

Here, a case where three detection element groups 12A are disposed on the printed circuit board 11, and each detection element group 12A includes nine Hall elements 13 will be described. FIGS. 3 and 4 illustrate a state in which the scale unit 20A is located on the second detection element group 12A from the right among the three detection element groups 12A.

In the case where the scale unit 20A moves, the magnet 23 sequentially moves above the Hall elements 13 in order from the Hall element 13 on the left side among the Hall elements 13 included in the detection element group 12A.

Hereinafter, the N-th (N is a natural number) Hall element 13 is referred to as the Hall element E(N). In FIG. 3, among the Hall elements 13 included in the detection element group 12A at which the scale unit 20A is located, the sixth Hall element 13 from the left is the Hall element E(N−1). The seventh Hall element 13 from the left is the Hall element E(N), and the eighth Hall element 13 from the left is the Hall element E(N+1).

FIG. 3 illustrates a state in which the right end position P1 of the magnet 23 has passed to the seventh Hall element E(N) from the left. Thereafter, the scale unit 20A further moves, and the right end position P1 of the magnet 23 reaches the eighth Hall element E(N+1).

In FIG. 4, similarly to FIG. 3, among the Hall elements 13 included in the detection element group 12A at which the scale unit 20A is located, the sixth Hall element 13 from the left is the Hall element E(N−1). The seventh Hall element 13 from the left is the Hall element E(N), and the eighth Hall element 13 from the left is the Hall element E(N+1).

FIG. 4 illustrates a state in which the right end position P1 of the magnet 23 has reached the eighth Hall element E(N+1) from the left.

The magnetic field intensity distribution of the magnet 23 is a sine wave. That is, the magnet 23 has a magnetic field intensity distribution of a sine wave for each magnetized pair. In this case, the magnetic field is distorted at both ends of the magnet 23 in the x direction.

As the magnet 23 moves in the plus x direction, the incremental positions at the Hall elements E(N−1), E(N), and E(N+1) vary. The computation unit 30 calculates the incremental position at each Hall element 13 based on the magnetic field intensity at each Hall element 13.

FIGS. 3 and 4 illustrate the locus of the value of the incremental position for explaining the incremental position calculated by the absolute position detection device 1A according to the first embodiment. In FIG. 3, the values of the incremental positions at the Hall elements E(N−1), E(N), and E(N+1) are denoted by $Q_1(N−1)$, $Q_1(N)$, and $Q_1(N+1)$. In FIG. 4, the values of the incremental positions at the Hall elements E(N−1), E(N), and E(N+1) are denoted by $Q_2(N−1)$, $Q_2(N)$, and $Q_2(N+1)$. In FIGS. 3 and 4, the horizontal axis represents the position x of the magnet 23, and the vertical axis represents the incremental position.

The interval between the maximum values of the incremental position corresponds to the magnetization pitch DB. The waveform of the incremental position is a triangular wave of a right triangle. One triangular wave corresponds to one incremental position indicated by 0 to 360 degrees. For example, given that the magnetization pitch DB is 10 mm, the incremental position indicated by the vertex of one triangular wave is 10 mm.

As illustrated in FIG. 3, when the right end position of the magnet 23 is the right end position P1 in FIG. 3, the Hall element E(N−1) detects information corresponding to the magnetic field intensity of the second magnetized pair. In addition, the Hall element E(N) detects information corresponding to the magnetic field intensity of the first magnetized pair, and the Hall element E(N+1) detects information corresponding to the magnetic field intensity of the magnetic field distorted at the x-directional end of the magnet 23.

Thereafter, the right end position P1 of the magnet 23 moves in the plus x direction in FIG. 3, and the Hall element E(N−1) detects the incremental position corresponding to the magnetic field intensity of the third magnetized pair and the incremental position corresponding to the magnetic field intensity of the fourth magnetized pair. Similarly to the detection of the incremental position by the Hall element E(N−1), the Hall element E(N) and the Hall element E(N+1) sequentially detect the incremental position corresponding to the magnetic field intensity of the magnetized pairs.

As illustrated in FIG. 4, when the right end position of the magnet 23 is the right end position P1 in FIG. 4, the Hall element E(N−1) detects information corresponding to the magnetic field intensity of the third magnetized pair, and the Hall element E(N) detects information corresponding to the magnetic field intensity of the second magnetized pair. The Hall element E(N+1) detects information corresponding to the magnetic field intensity of the first magnetized pair; the detected information corresponding to the magnetic field intensity of the first magnetized pair also includes information corresponding to the magnetic field intensity of the magnetic field distorted at the x-directional end of the magnet 23.

Thereafter, the right end position P1 of the magnet 23 moves in the plus x direction in FIG. 4, and the Hall element E(N−1) detects the incremental position corresponding to the magnetic field intensity of the fourth magnetized pair and the incremental position corresponding to the magnetic field intensity of the fifth magnetized pair in order. Similarly to the detection of the incremental position by the Hall element E(N−1), the Hall element E(N) and the Hall element E(N+1) sequentially detect the incremental position corresponding to the magnetic field intensity of the magnetized pairs.

In the case where the mover 72 moves, as illustrated in FIGS. 3 and 4, after the detection of the incremental position by the Hall element E(N−1) is started, the detection of the incremental position by the Hall element E(N) is started, and thereafter, the detection of the incremental position by the Hall element E(N+1) is started.

In addition, in the case where the mover 72 moves, as illustrated in FIGS. 3 and 4, after the detection of the incremental position by the Hall element E(N−1) ends, the detection of the incremental position by the Hall element E(N) ends, and thereafter, the detection of the incremental position by the Hall element E(N+1) ends.

The absolute position detection device 1A can calculate information corresponding to the positional relationship between the mover 72 and the stator 71 regardless of whether the mover 72 is moving or stationary.

In the first embodiment, the magnetization pitch DB and the inter-element distance DA are set to the same distance. Therefore, the waveform of the incremental position is shifted by 360 degrees between adjacent Hall elements 13. In other words, the waveform of the incremental position is shifted by one triangular wave between adjacent Hall elements 13. For example, the waveform of the incremental position is shifted by 360 degrees between the Hall element E(N−1) and the Hall element E(N), and the waveform of the incremental position is shifted by 360 degrees between the Hall element E(N) and the Hall element E(N+1).

When the magnet 23 moves in the plus x direction, the waveform of the incremental position detected by the Hall element 13 is distorted at the magnet end as illustrated in FIGS. 3 and 4. In FIGS. 3 and 4, a region of the incremental position having a distorted waveform is denoted by magnetic field distortion region MD. In the first embodiment, the computation unit 30 detects the position (end position) of the magnet end of the magnet 23 using the distortion of the incremental position at the magnet end.

If the Hall elements 13 are not at a position where the distorted magnetic field of the magnet end is detected, the values of the incremental position detected by the Hall elements 13 are the same. On the other hand, if any of the Hall elements 13 is at a position where the distorted magnetic field of the magnet end is detected, the value of the incremental position of the Hall element 13 that detects the distorted magnetic field is different from the values of the incremental position of the other Hall elements 13 detecting the magnetic field. This is because the waveform of the incremental position at the magnet end is distorted compared to the waveforms of the other incremental positions due to the distortion of the magnetic field at the magnet end. For all the inter-element spaces between the Hall elements 13, the computation unit 30 compares the values of the incremental position between adjacent Hall elements 13, and determines between which Hall elements 13 the magnet end is located based on the comparison result.

Figure 5:
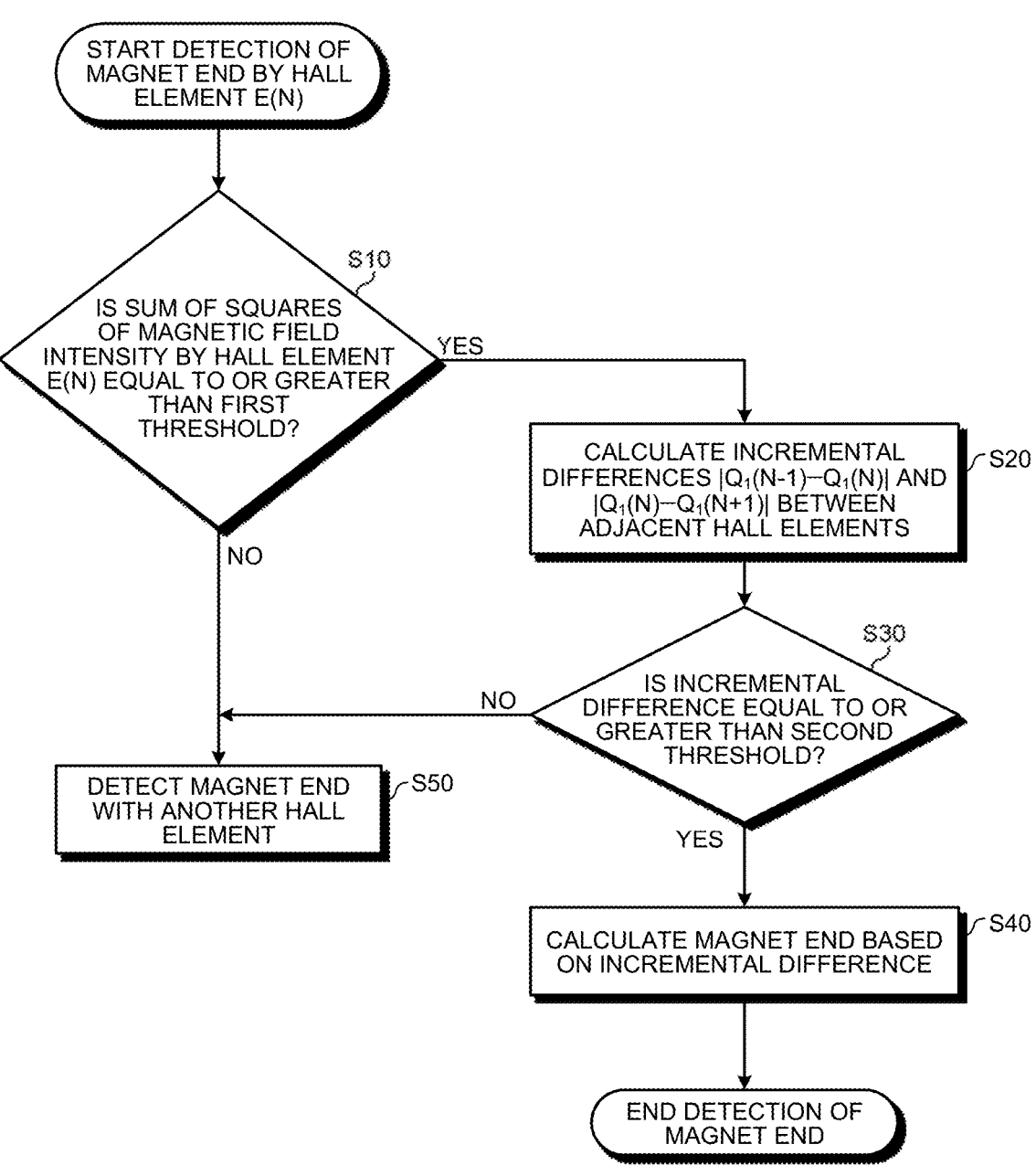
FIG. 5 is a flowchart illustrating a procedure for a process of detecting the magnet end position of the scale unit by the absolute position detection device according to the first embodiment.

FIG. 5 is a flowchart illustrating a procedure for a process of detecting the magnet end position of the scale unit by the absolute position detection device according to the first embodiment. At the end of the magnet 23, the magnetic field is distorted at the magnet end as described above. Therefore, in the magnet end position detection in the present disclosure, for detecting the actual magnet end (for example, the right end position P1), the absolute position detection device 1A first detects the boundary line (for example, right end boundary line D1 illustrated in FIGS. 3 and 4) of magnetic field distortion in the magnet 23, and then detects the magnet end position. Here, a process in which the computation unit 30 determines whether the right end boundary line D1 of the magnet 23 exists outside the Hall element E(N) will be described. That is, a process in which the computation unit 30 determines whether the right end boundary line D1 of the magnet 23 exists between the Hall element E(N−1) and the Hall element E(N) or between the Hall element E(N) and the Hall element E(N+1) will be described. Hereinafter, a case where the right end position P1 exists outside the Hall element E(N), in other words, a case where the right end boundary line D1 of the magnet 23 exists between the Hall element E(N−1) and the Hall element E(N) or between the Hall element E(N) and the Hall element E(N+1) specifically means the following case (C1) or (C2).

(C1) case where the right end boundary line D1 exists between the Hall elements E(N−1) and E(N) or between the Hall elements E(N) and E(N+1)

(C2) case where the right end boundary line D1 exists at a position facing the Hall element E(N−1) or a position facing the Hall element E(N+1)

The computation unit 30 calculates the sum of squares of the magnetic field intensity detected by the Hall element E(N) and determines whether the calculated sum of squares is equal to or greater than the first threshold stored in the storage unit 31 (step S10). In response to determining that the calculated sum of squares is less than the first threshold (step S10, No), the computation unit 30 determines that there is no right end boundary line D1 outside the Hall element E(N), and determines whether the right end boundary line D1 of the magnet 23 exists outside another Hall element 13 (step S50).

In response to determining that the calculated sum of squares is equal to or greater than the first threshold (step S10, Yes), the computation unit 30 compares the incremental positions between adjacent Hall elements 13. That is, the computation unit 30 calculates the incremental difference, which is the difference in incremental position between adjacent Hall elements 13. Here, a specific description will be given using the three Hall elements E(N−1), E(N), and E(N+1) illustrated in FIG. 3 and the incremental positions $Q_1(N-1)$, $Q_1(N)$, and $Q_1(N+1)$ detected by the respective Hall elements E(N−1), E(N), and E(N+1). The computation unit 30 calculates $|Q_1(N-1)-Q_1(N)|$ as the incremental difference between the incremental position $Q_1(N-1)$ of the Hall element E(N−1) and the incremental position $Q_1(N)$ of the Hall element E(N), and calculates $|Q_1(N)-Q_1(N+1)|$ as the incremental difference between the incremental position $Q_1(N)$ of the Hall element E(N) and the incremental position $Q_1(N+1)$ of the Hall element E(N+1). That is, the computation unit 30 calculates the incremental differences $|Q_1(N-1)-Q_1(N)|$ and $|Q_1(N)-Q_1(N+1)|$ between adjacent Hall elements 13 (step S20). The computation unit 30 determines whether each of the calculated incremental differences is equal to or greater than the second threshold stored in the storage unit 31 (step S30). That is, the computation unit 30 determines whether $|Q_1(N-1)-Q_1(N)|$ is equal to or greater than the second threshold, and determines whether $|Q_1(N)-Q_1(N+1)|$ is equal to or greater than the second threshold.

In response to determining that all of the calculated incremental differences are less than the second threshold (step S30, No), the computation unit 30 determines that there is no right end boundary line D1 outside the Hall element E(N), and determines whether the right end boundary line D1 of the magnet 23 exists outside another Hall element 13 (step S50).

In response to determining that any of the calculated incremental differences is equal to or greater than the second threshold (step S30, Yes), the computation unit 30 calculates the magnet end based on the incremental difference (step S40). That is, the computation unit 30 determines that the right end boundary line D1 is located between the Hall elements 13 corresponding to the incremental difference that is equal to or greater than the second threshold. In this manner, the computation unit 30 determines that the right end boundary line D1 is located in the inter-element space at which the absolute value of the difference between the first incremental position and the second incremental position is equal to or greater than the specific value (second threshold). Then, because the inter-element distance DA and the magnetization pitch DB are the same based on the information of the inter-element distance DA and the magnetization pitch DB, and the right end boundary line D1 is located between the Hall elements 13 on the side where the incremental difference exceeds the second threshold, the computation unit 30 determines that the right end position P1 of the magnet 23 is also located between the Hall elements 13 on the side where the incremental difference exceeds the second threshold.

For example, if $|Q_1(N-1)-Q_1(N)|$ is equal to or greater than the second threshold, the computation unit 30 determines that the right end boundary line D1 exists between the Hall element E(N−1) and the Hall element E(N). If $|Q_1(N)-Q_1(N+1)|$ is equal to or greater than the second threshold, the computation unit 30 determines that the right end boundary line D1 exists between the Hall element E(N) and the Hall element E(N+1). For example, the computation unit 30 determines that the right end boundary line D1 is located in the inter-element space at which one of $|Q_1(N-1)-Q_1(N)|$ and $|Q_1(N)-Q_1(N+1)|$ is zero and the other is a value greater than zero.

In the above description, the Hall elements E(N−1), E(N), and E(N+1) illustrated in FIGS. 3 and $Q_1(N-1)$, $Q_1(N)$, and $Q_1(N+1)$ which are the values of the incremental positions detected by these Hall elements 13 have been used. Similarly to the case of FIG. 3, in the case where the Hall elements E(N−1), E(N), and E(N+1) and the values $Q_2(N-1)$, $Q_2(N)$, and $Q_2(N+1)$ of the incremental positions illustrated in FIG. 4 are used, and the right end boundary line D1 can be determined.

Among the three Hall elements E(N−1), E(N), and E(N+1) that detect the incremental positions that are compared by the computation unit 30 to determine the position where the right end boundary line D1 exists, the Hall element E(N) is an example of the first detection element, the Hall element E(N+1) is an example of the second detection element, and the Hall element E(N−1) is an example of the third detection element. That is, the Hall elements E(N−1), E(N), and E(N+1) are an example of three detection elements disposed adjacent to each other along the moving direction of the scale unit 20A.

In order to distinguish between the right end boundary line D1 of the magnet 23 or the left end boundary line of the magnet 23, the computation unit 30 uses the incremental positions of the three detection elements disposed adjacent to each other along the moving direction of the scale unit 20A used in the process of detecting the magnet end position. That is, if the absolute value of the difference between the value of the incremental position of the Hall element E(N) and the value of the incremental position of the Hall element E(N+1) is equal to or greater than the specific value (second threshold), the computation unit 30 can determine that the right end boundary line D1 exists outside (in the plus x direction of) the Hall element E(N). In other words, if the absolute value of the difference between the values of the incremental positions detected by the Hall element E(N+1), which is located in the plus x direction with respect to the Hall element E(N), and the Hall element E(N) is equal to or greater than the second threshold, and the absolute value of the difference between the values of the incremental positions detected by the Hall element E(N−1), which is located in the minus x direction with respect to the Hall element E(N), and the Hall element E(N) is less than the second threshold, the computation unit 30 can determine that the right end boundary line D1 exists outside (in the plus x direction of) the Hall element E(N).

If the absolute value of the difference between the value of the incremental position of the Hall element E(N) and the value of the incremental position of the Hall element E(N−1) is equal to or greater than the specific value (second threshold), the computation unit 30 may determine that the left end boundary line exists outside (in the minus x direction of) the Hall element E(N). In other words, if the absolute value of the difference between the values of the incremental positions detected by the Hall element E(N−1), which is located in the minus x direction with respect to the Hall element E(N), and the Hall element E(N) is equal to or greater than the second threshold, and the absolute value of the difference between the values of the incremental positions detected by the Hall element E(N+1), which is located in the positive x direction with respect to the Hall element E(N), and the Hall element E(N) is less than the second threshold, the computation unit 30 may determine that the left end boundary line exists outside (in the minus x direction of) the Hall element E(N).

By determining the right end boundary line D1 as described above, the computation unit 30 can detect the right end position P1 of the magnet 23 based on the information of the inter-element distance DA and the magnetization pitch DB. In addition, by determining the left end boundary line as described above, the computation unit 30 can similarly detect the position of the left end boundary line of the magnet 23 based on the information of the inter-element distance DA and the magnetization pitch DB.

Figure 6:
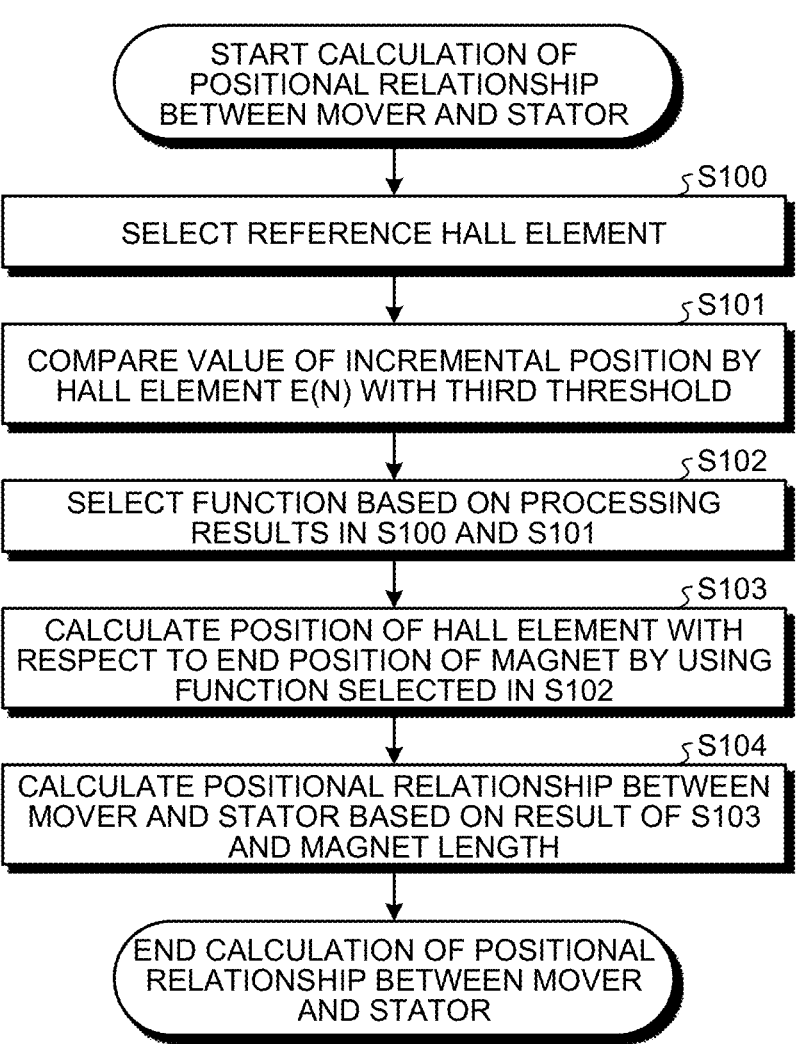
FIG. 6 is a flowchart illustrating a procedure for a process of calculating the positional relationship between the mover and the stator by the absolute position detection device according to the first embodiment.

FIG. 6 is a flowchart illustrating a procedure for a process of calculating the positional relationship between the mover and the stator by the absolute position detection device according to the first embodiment. The computation unit 30 selects any one of the two Hall elements 13 between which the boundary line of magnetic field distortion is determined to exist as a reference Hall element (step S100). The boundary line of magnetic field distortion in the magnet 23 is a portion where the magnetic field intensity distribution of the magnet 23 starts to deviate from the sine wave. That is, the boundary line of magnetic field distortion in the magnet 23 is the boundary of the regions in the magnet 23 between a region where the magnet 23 has a magnetic field intensity distribution of a sine wave detected and a region where the magnet 23 has a magnetic field intensity distribution other than a sine wave detected. The boundary line of magnetic field distortion in the magnet 23 is a plane (in FIGS. 3 and 4, a line extending in the z direction) parallel to the yz plane of the magnet 23, and its position in the x direction moves as the magnet 23 moves in the x direction. The reference Hall element is an example of a reference detection element.

The computation unit 30 compares, with the third threshold, the value of the incremental position detected by the Hall element 13 corresponding to the first detection element among the three Hall elements 13 from which the position of the magnet end is detected (step S101). In the first embodiment, the computation unit 30 compares the value of the incremental position detected by the Hall element E(N) with the third threshold. Here, the third threshold is a threshold set to select a function for calculating the position of the Hall element 13 with respect to the end position of the magnet 23. For example, the value of the length from the magnet end to the boundary line of magnetic field distortion in the magnet 23 may be set as the third threshold. Because the boundary line of magnetic field distortion in the magnet 23 varies depending on the magnetic field intensity generated by the magnetized pairs of the magnet 23, the third threshold is set according to the magnetized pairs to be used.

The computation unit 30 selects a function for calculating the position of the Hall element 13 with respect to the end position of the magnet 23 expressed by Formulas (1) to (3) below based on the reference Hall element selected in step S100 and the comparison result in step S101 (step S102). Formulas (1) to (3) are formulas (functions) for the computation unit 30 to calculate the position of the Hall element 13 with respect to the end position of the magnet 23 based on the value of the incremental position of the target Hall element 13, a number of the target Hall element 13 spacing from the reference Hall element (namely, which order from the reference Hall element), and the magnetization pitch DB. In step S102, the computation unit 30 checks whether the reference Hall element selected in step S100 is the Hall element 13 detecting information corresponding to the magnetic field intensity including the distortion of the magnetic field, and selects Formulas (1) to (3) by checking whether the value of the incremental position compared in step S101 exceeds the third threshold. In this manner, the computation unit 30 selects one function from among Formulas (1) to (3) based on the processing results in steps S100 and S101 (step S102).

Formula (1) is selected when the value of the incremental position detected by the reference Hall element does not include the distortion of the magnetic field and the value compared in step S101 exceeds the third threshold, or when the value of the incremental position detected by the reference Hall element includes the distortion of the magnetic field and the value compared in step S101 does not exceed the third threshold.

Formula (2) is selected when the value of the incremental position detected by the reference Hall element includes the distortion of the magnetic field and the value compared in step S101 exceeds the third threshold.

Formula (3) is selected when the value of the incremental position detected by the reference Hall element does not include the distortion of the magnetic field and the value compared in step S101 does not exceed the third threshold.

$$\text{Position of Hall element } 13 = Q + (DB \times \text{a number of the Hall element spacing from reference detection element}) \tag{1}$$

$$\text{Position of Hall element } 13 = Q + (DB \times (\text{a number of the Hall element spacing from reference detection element} - 1)) \tag{2}$$

$$\text{Position of Hall element } 13 = Q + (DB \times (\text{a number of the Hall element spacing from reference detection element} + 1)) \tag{3}$$

In Formulas (1) to (3), the position of the Hall element 13 is the position of the Hall element 13 with respect to the end position of the magnet 23. Q is the value of the incremental position detected by the target Hall element 13 of which the position with respect to the end position of the magnet 23 is calculated. DB is the magnetization pitch. The number of the spacing from the reference detection element indicates what number the Hall element 13 of which the position with respect to the end position of the magnet 23 is calculated is from the reference detection element. For example, taking the Hall elements 13 illustrated in FIG. 3 as an example, given that the Hall element E(N) is the reference Hall element (reference detection element), the number of the spacing of the Hall element E(N−1) from the reference detection element is "1". Similarly, the number of the spacing of the Hall element E(N−2) from the reference detection element is "2". The number of the spacing from the reference detection element at the Hall element 13 of which the position with respect to the end position of the magnet 23 is calculated can be calculated from the coordinates of each Hall element 13 stored in the storage unit 31.

The computation unit 30 calculates the position of the Hall element 13 with respect to the end position of the magnet 23 by using the function selected in step S102 from among Formulas (1) to (3) (step S103). Specifically, the computation unit 30 receives information corresponding to the magnetic field intensity from the Hall element 13 detecting information corresponding to the magnetic field intensity among the Hall elements 13 in the detection element group 12A including the Hall element 13 that is the reference Hall element. The computation unit 30 acquires, from the storage unit 31, the coordinates of the Hall element 13 detecting the received information corresponding to the magnetic field intensity and the coordinates of the Hall element 13 that is the reference Hall element. Furthermore, the computation unit 30 acquires the magnetization pitch DB from the storage unit 31.

The computation unit 30 calculates the incremental position in each Hall element 13 based on the information corresponding to the magnetic field intensity received from each Hall element 13. If the incremental position is received as the information corresponding to the magnetic field intensity, the computation unit 30 can skip the calculation of the incremental position. Then, the computation unit 30 calculates the number of the spacing of each Hall element 13 from the reference Hall element from the acquired coordinates of the Hall elements 13. Note that the number of the spacing of each Hall element 13 from the reference Hall element can be stored in the storage unit 31 in advance, in which case the calculation of the number of the spacing of each Hall element 13 from the reference Hall element can be skipped. In this case, the storage unit 31 stores, for example, the numbers of the spacings of the first to ninth Hall elements 13 with the X-th (X is a natural number from one to nine) Hall element 13 serving as the reference Hall element.

The computation unit 30 calculates the position of the Hall element 13 with respect to the end position of the magnet 23 using the selected one of Formulas (1) to (3) based on the value of the incremental position of the target Hall element 13, the number of the spacing from the reference Hall element, and the magnetization pitch DB.

The computation unit 30 calculates the positional relationship between the mover 72 and the stator 71 based on the result of step S103 (the position of the Hall element 13 with respect to the end position of the magnet 23 calculated in step S103) and the length of the magnet 23 in the moving direction (step S104). The computation unit 30 acquires, as the length of the magnet 23 in the moving direction, a value stored as the magnet length in the storage unit 31, and uses the value.

Returning to FIGS. 3 and 4, a case where the right end position P1 exists at the position illustrated in FIG. 3 or 4 will be described.

First, when the right end position P1 of the magnet 23 exists at the position illustrated in FIG. 3, the computation unit 30 determines that the right end boundary line D1 exists between the Hall elements E(N) and E(N+1) by using the values of the incremental positions detected by the Hall elements E(N−1), E(N), and E(N+1). Thus, the reference Hall element is either the Hall element E(N) or the Hall element E(N+1). Hereinafter, calculation of the positional relationship between the mover 72 and the stator 71 by the absolute position detection device 1A according to the first embodiment will be described in detail in each of the case where the reference Hall element is the Hall element E(N) and the case where the reference Hall element is the Hall element E(N+1). Here, the Hall element E(N) is the first detection element, the Hall element E(N+1) is the second detection element, and the Hall element E(N−1) and the Hall element E(N−2) are the third detection elements.

Selecting the Hall element E(N) as the reference Hall element in step S100, the computation unit 30 compares the incremental position of the Hall element E(N) with the third threshold in accordance with step S101. In the first embodiment, the third threshold is set by the value of the length from the right end position P1 of the magnet 23 to the boundary line (right end boundary line D1) of magnetic field distortion in the magnet 23, and the value of the incremental position detected by the Hall element E(N) in FIG. 3 exceeds the third threshold. The Hall element E(N) does not include the magnetic field distortion in the detected value of the incremental position. Thus, the computation unit 30 selects Formula (1) in accordance with step S102.

In accordance with step S103, the computation unit 30 calculates the position of the Hall element 13 with respect to the end position of the magnet 23 using Formula (1). In step S103, the computation unit 30 calculates the position, with respect to the end position of the magnet 23, of each of the Hall elements 13 detecting information corresponding to the magnetic field intensity in the detection element group 12A including the Hall element E(N) serving as the reference Hall element. Here, calculation for the three Hall elements E(N−2), E(N−1), and E(N) will be described with a specific example. Note that the example described here assumes that the magnetization pitch DB is 10 mm.

The computation unit 30 calculates the value of the incremental position of each of the Hall elements E(N−2), E(N−1), and E(N). The computation unit 30 acquires the coordinates (element coordinates) of the Hall elements E(N−2), E(N−1), and E(N) from the storage unit 31, and calculates the number of the spacing of each of the Hall elements E(N−2), E(N−1), and E(N) from the reference Hall element. The spacing of the Hall element E(N−1) from the reference Hall element is "1", the number of the spacing of the Hall element E(N) from the reference Hall element is "0", and the number of the spacing of the Hall element E(N−2) from the reference Hall element is "2". Furthermore, the computation unit 30 acquires the magnetization pitch DB from the storage unit 31.

When calculating 9 mm as the value of the incremental position of the Hall element E(N), the computation unit 30 calculates the position of the Hall element E(N) with respect to the end position of the magnet 23 as "9+(10×0)=9" using Formula (1). Consequently, the computation unit 30 calculates a position of 9 mm leftward from the right end position P1, which is the end position of the magnet 23, as the position of the Hall element E(N). When calculating 9 mm as the value of the incremental position of the Hall element E(N−1), the computation unit 30 calculates the position of the Hall element E(N−1) with respect to the end position of the magnet 23 as "9+(10×1)=19" using Formula (1). Consequently, the computation unit 30 calculates a position of 19 mm leftward from the right end position P1 as the position of the Hall element E(N−1). Then, when calculating 9 mm as the value of the incremental position of the Hall element E(N−2), the computation unit 30 calculates the position of the Hall element E(N−2) with respect to the end position of the magnet 23 as "9+(10×2)=29" using Formula (1). Consequently, the computation unit 30 calculates a position of 29 mm leftward from the right end position P1 as the position of the Hall element E(N−2).

As described above, when the Hall element E(N) is selected as the reference Hall element in the case where the right end position P1 of the magnet 23 exists at the position illustrated in FIG. 3, the computation unit 30 calculates a position of 9 mm leftward from the right end position P1 as the position of the Hall element E(N) with respect to the end position of the magnet 23. In addition, the computation unit 30 calculates a position of 19 mm leftward from the right end position P1 as the position of the Hall element E(N−1) with respect to the end position of the magnet 23. In addition, the computation unit 30 calculates a position of 29 mm leftward from the right end position P1 as the position of the Hall element E(N−2) with respect to the end position of the magnet 23.

Next, a case where the right end position P1 of the magnet 23 exists at the position illustrated in FIG. 3 and the computation unit 30 selects the Hall element E(N+1) as the reference Hall element will be described.

If the computation unit 30 selects the Hall element E(N+1) as the reference Hall element in step S100, the computation unit 30 compares the incremental position of the Hall element E(N) with the third threshold in accordance with step S101. In the first embodiment, the third threshold is set by the value of the length from the right end position P1 of the magnet 23 to the boundary line (right end boundary line D1) of magnetic field distortion in the magnet 23, and the value of the incremental position detected by the Hall element E(N) in FIG. 3 exceeds the third threshold. The Hall element E(N+1) includes the magnetic field distortion in the detected value of the incremental position. Thus, the computation unit 30 selects Formula (2) in accordance with step S102.

In accordance with step S103, the computation unit 30 calculates the position of the Hall element 13 with respect to the end position of the magnet 23 using Formula (2). Step S103 calculates the position, with respect to the end position of the magnet 23, of each of the Hall elements 13 detecting information corresponding to the magnetic field intensity in the detection element group 12A including the Hall element E(N+1) serving as the reference Hall element. Here, calculation for the three Hall elements E(N−1), E(N), and E(N+1) will be described with a specific example. Note that the example described here assumes that the magnetization pitch DB is 10 mm.

The computation unit 30 calculates the value of the incremental position of each of the Hall elements E(N−1), E(N), and E(N+1). The computation unit 30 acquires the coordinates of the Hall elements E(N−1), E(N), and E(N+1) from the storage unit 31, and calculates the number of the spacing of each of the Hall elements E(N−1), E(N), and E(N+1) from the reference Hall element. The number of the spacing of the Hall element E(N−1) from the reference Hall element is "2", the number of the spacing of the Hall element E(N) from the reference Hall element is "1", and the number of the spacing of the Hall element E(N+1) from the reference Hall element is "0". Furthermore, the computation unit 30 acquires the magnetization pitch DB from the storage unit 31.

When calculating 9 mm as the value of the incremental position of the Hall element E(N), the computation unit 30 calculates the position of the Hall element E(N) with respect to the end position of the magnet 23 as "9+(10×(1−1))=9" using Formula (2). Consequently, the computation unit 30 calculates a position of 9 mm leftward from the right end position P1, which is the end position of the magnet 23, as the position of the Hall element E(N). When calculating 9 mm as the value of the incremental position of the Hall element E(N−1), the computation unit 30 calculates the position of the Hall element E(N−1) with respect to the end position of the magnet 23 as "9+(10×(2−1))=19" using Formula (2). Consequently, the computation unit 30 calculates a position of 19 mm leftward from the right end position P1 as the position of the Hall element E(N−1). Then, when calculating 2 mm as the value of the incremental position of the Hall element E(N+1), the computation unit 30 calculates the position of the Hall element E(N+1) with respect to the end position of the magnet 23 as "2+(10×(0−1))=−8" using Formula (2). However, the calculation result which is a negative value means that the Hall element E(N+1) detects information corresponding to the magnetic field intensity but only detects the distortion of the magnetic field at the end of the magnet 23, and the computation unit 30 can recognize that the magnet 23 has not reached the Hall element E(N+1).

As described above, when the Hall element E(N+1) is selected as the reference Hall element in the case where the right end position P1 of the magnet 23 exists at the position illustrated in FIG. 3, the computation unit 30 calculates a position of 9 mm leftward from the right end position P1 as the position of the Hall element E(N) with respect to the end position of the magnet 23. In addition, the computation unit 30 calculates a position of 19 mm leftward from the right end position P1 as the position of the Hall element E(N−1) with respect to the end position of the magnet 23. In addition, the computation unit 30 computationally calculates the position of the Hall element E(N+1) with respect to the end position of the magnet 23, but does not output the position as the position of the Hall element 13 with respect to the end position of the magnet 23 because the calculation result is a negative value.

As described above, when the right end position P1 of the magnet 23 exists at the position illustrated in FIG. 3, the function used by the computation unit 30, that is, the function for calculating the position of the Hall element 13 with respect to the end position of the magnet 23, differs depending on the reference Hall element selected in step S100 and the result of the comparison in step S101. Here, because the right end position P1 of the magnet 23 is the same, strictly, the function used by the computation unit 30 for calculating the position of the Hall element 13 with respect to the end position of the magnet 23 differs depending on the difference in the selected reference Hall element. However, regardless of which function is used, the computation unit 30 calculates the position of the Hall element 13 with respect to the end position of the magnet 23 based on the value of the incremental position of the target Hall element 13, the number of the spacing from the reference Hall element, and the magnetization pitch DB. Therefore, the computation unit 30 can calculate a similar result as the position of the Hall element 13 with respect to the end position of the magnet 23.

In accordance with step S104, the computation unit 30 calculates the positional information of the Hall element 13 with respect to the scale unit 20A, as the positional relationship between the mover 72 and the stator 71, based on the position of the Hall element 13 with respect to the end position of the magnet 23 calculated in step S103 and the length of the magnet 23 in the moving direction.

Next, when the right end position P1 of the magnet 23 exists at the position illustrated in FIG. 4, the computation unit 30 determines that the right end boundary line D1 exists between the Hall elements E(N) and E(N+1) by using the values of the incremental positions detected by the Hall elements E(N−1), E(N), and E(N+1). Thus, the reference Hall element is either the Hall element E(N) or the Hall element E(N+1). Hereinafter, calculation of the positional relationship between the mover 72 and the stator 71 by the absolute position detection device 1A according to the first embodiment will be described in detail in each of the case where the reference Hall element is the Hall element E(N) and the case where the reference Hall element is the Hall element E(N+1). Here, the Hall element E(N) is the first detection element, the Hall element E(N+1) is the second detection element, and the Hall element E(N−1) and the Hall element E(N−2) are the third detection elements.

Selecting the Hall element E(N) as the reference Hall element in step S100, the computation unit 30 compares the incremental position of the Hall element E(N) with the third threshold in accordance with step S101. In the first embodiment, the third threshold is set by the value of the length from the right end position P1 of the magnet 23 to the boundary line (right end boundary line D1) of magnetic field distortion in the magnet 23, and the value of the incremental position detected by the Hall element E(N) in FIG. 4 does not exceed the third threshold. The Hall element E(N) does not include the magnetic field distortion in the detected value of the incremental position. Thus, the computation unit 30 selects Formula (3) in accordance with step S102.

In accordance with step S103, the computation unit 30 calculates the position of the Hall element 13 with respect to the end position of the magnet 23 using Formula (3). In step S103, the computation unit 30 calculates the position, with respect to the end position of the magnet 23, of each of the Hall elements 13 detecting information corresponding to the magnetic field intensity in the detection element group 12A including the Hall element E(N) serving as the reference Hall element. Here, calculation for the three Hall elements E(N−2), E(N−1), and E(N) will be described with a specific example. Note that the example described here assumes that the magnetization pitch DB is 10 mm.

The computation unit 30 calculates the value of the incremental position of each of the Hall elements E(N−2), E(N−1), and E(N). The computation unit 30 acquires the coordinates (element coordinates) of the Hall elements E(N−2), E(N−1), and E(N) from the storage unit 31, and calculates the number of the spacing of each of the Hall elements E(N−2), E(N−1), and E(N) from the reference Hall element. The number of the spacing of the Hall element E(N−1) from the reference Hall element is "1", the number of the spacing of the Hall element E(N) from the reference Hall element is "0", and the number of the spacing of the Hall element E(N−2) from the reference Hall element is "2".

Furthermore, the computation unit 30 acquires the magnetization pitch DB from the storage unit 31.

When calculating 2 mm as the value of the incremental position of the Hall element E(N), the computation unit 30 calculates the position of the Hall element E(N) with respect to the end position of the magnet 23 as "2+(10×(0+1))=12" using Formula (3). Consequently, the computation unit 30 calculates a position of 12 mm leftward from the right end position P1, which is the end position of the magnet 23, as the position of the Hall element E(N). When calculating 2 mm as the value of the incremental position of the Hall element E(N−1), the computation unit 30 calculates the position of the Hall element E(N−1) with respect to the end position of the magnet 23 as "2+(10×(1+1))=22" using Formula (3). Consequently, the computation unit 30 calculates a position of 22 mm leftward from the right end position P1 as the position of the Hall element E(N−1).

Then, when calculating 2 mm as the value of the incremental position of the Hall element E(N−2), the computation unit 30 calculates the position of the Hall element E(N−2) with respect to the end position of the magnet 23 as "2+(10×(2+1))=32" using Formula (3). Consequently, the computation unit 30 calculates a position of 32 mm leftward from the right end position P1 as the position of the Hall element E(N−2).

As described above, when the Hall element E(N) is selected as the reference Hall element in the case where the right end position P1 of the magnet 23 exists at the position illustrated in FIG. 4, the computation unit 30 calculates a position of 12 mm leftward from the right end position P1 as the position of the Hall element E(N) with respect to the end position of the magnet 23. In addition, the computation unit 30 calculates a position of 22 mm leftward from the right end position P1 as the position of the Hall element E(N−1) with respect to the end position of the magnet 23. In addition, the computation unit 30 calculates a position of 32 mm leftward from the right end position P1 as the position of the Hall element E(N−2) with respect to the end position of the magnet 23.

Next, a case where the right end position P1 of the magnet 23 exists at the position illustrated in FIG. 4 and the computation unit 30 selects the Hall element E(N+1) as the reference Hall element will be described.

If the computation unit 30 selects the Hall element E(N+1) as the reference Hall element in step S100, the computation unit 30 compares the incremental position of the Hall element E(N) with the third threshold in accordance with step S101. In the first embodiment, the third threshold is set by the value of the length from the right end position P1 of the magnet 23 to the boundary line (right end boundary line D1) of magnetic field distortion in the magnet 23, and the value of the incremental position detected by the Hall element E(N) in FIG. 4 does not exceed the third threshold. The Hall element E(N+1) includes the magnetic field distortion in the detected value of the incremental position. Thus, the computation unit 30 selects Formula (1) in accordance with step S102.

In accordance with step S103, the computation unit 30 calculates the position of the Hall element 13 with respect to the end position of the magnet 23 using Formula (1). Step S103 calculates the position, with respect to the end position of the magnet 23, of each of the Hall elements 13 detecting information corresponding to the magnetic field intensity in the detection element group 12A including the Hall element E(N+1) serving as the reference Hall element. Here, similarly to the above, calculation for the three Hall elements E(N−1), E(N), and E(N+1) will be described with a specific example. Note that the example described here assumes that the magnetization pitch DB is 10 mm.

The computation unit 30 calculates the value of the incremental position of each of the Hall elements E(N−1), E(N), and E(N+1). The computation unit 30 acquires the coordinates of the Hall elements E(N−1), E(N), and E(N+1) from the storage unit 31, and calculates the number of the spacing of each of the Hall elements E(N−1), E(N), and E(N+1) from the reference Hall element. The number of the spacing of the Hall element E(N−1) from the reference Hall element is "2", the number of the spacing of the Hall element E(N) from the reference Hall element is "1", and the number of the spacing of the Hall element E(N+1) from the reference Hall element is "0". Furthermore, the computation unit 30 acquires the magnetization pitch DB from the storage unit 31.

When calculating 2 mm as the value of the incremental position of the Hall element E(N), the computation unit 30 calculates the position of the Hall element E(N) with respect to the end position of the magnet 23 as "2+(10×1)=12" using Formula (1). Consequently, the computation unit 30 calculates a position of 12 mm leftward from the right end position P1, which is the end position of the magnet 23, as the position of the Hall element E(N). When calculating 2 mm as the value of the incremental position of the Hall element E(N−1), the computation unit 30 calculates the position of the Hall element E(N−1) with respect to the end position of the magnet 23 as "2+(10×2)=22" using Formula (1). Consequently, the computation unit 30 calculates a position of 22 mm leftward from the right end position P1 as the position of the Hall element E(N−1). Then, when calculating 3 mm as the value of the incremental position of the Hall element E(N+1), the computation unit 30 calculates the position of the Hall element E(N+1) with respect to the end position of the magnet 23 as "3+(10×0)=3" using Formula (1). Consequently, the computation unit 30 calculates a position of 3 mm leftward from the right end position P1 as the position of the Hall element E(N+1).

As described above, when the Hall element E(N+1) is selected as the reference Hall element in the case where the right end position P1 of the magnet 23 exists at the position illustrated in FIG. 4, the computation unit 30 calculates a position of 12 mm leftward from the right end position P1 as the position of the Hall element E(N) with respect to the end position of the magnet 23. In addition, the computation unit 30 calculates a position of 22 mm leftward from the right end position P1 as the position of the Hall element E(N−1) with respect to the end position of the magnet 23. In addition, the computation unit 30 calculates a position of 3 mm leftward from the right end position P1 as the position of the Hall element E(N+1) with respect to the end position of the magnet 23.

As described above, when the right end position P1 of the magnet 23 exists at the position illustrated in FIG. 4, the function used by the computation unit 30, that is, the function for calculating the position of the Hall element 13 with respect to the end position of the magnet 23, differs depending on the reference Hall element selected in step S100 and the result of the comparison in step S101. Here, because the right end position P1 of the magnet 23 is the same, strictly, the function used by the computation unit 30 for calculating the position of the Hall element 13 with respect to the end position of the magnet 23 differs depending on the difference in the selected reference Hall element. However, regardless of which function is used, the computation unit 30 calculates the position of the Hall element 13 with respect to the end position of the magnet 23 based on the value of the incremental position of the target Hall element 13, the number of the spacing from the reference Hall element, and the magnetization pitch DB. Therefore, the computation unit 30 can calculate a similar result as the position of the Hall element 13 with respect to the end position of the magnet 23.

In accordance with step S104, the computation unit 30 calculates the positional information of the Hall element 13 with respect to the scale unit 20A as the positional relationship between the mover 72 and the stator 71 based on the position of the Hall element 13 with respect to the end position of the magnet 23 calculated in step S103 and the length of the magnet 23 in the moving direction.

When comparing FIG. 3 with FIG. 4, because the positions where the right end position P1 of the magnet 23 exists differ from each other, the values of the incremental position detected by the Hall element E(N) which is the first detection element differ from each other. The function for calculating the position of the Hall element 13 with respect to the end position of the magnet 23 is selected based on the reference Hall element selected in step S100 and the result of the comparison in step S101. Therefore, the computation unit 30 can calculate the position of the Hall element 13 with respect to the end position of the magnet 23 based on the value of the incremental position of the target Hall element 13, the number of the spacing from the reference Hall element, and the magnetization pitch DB.

The computation unit 30 outputs the positional information of the Hall element 13 with respect to the scale unit 20A to an external device such as a display device (not illustrated) as the positional relationship between the mover 72 and the stator 71.

Because the computation unit 30 calculates the positional information of the Hall element 13 with respect to the scale unit 20A based on the position of the Hall element 13 with respect to the end position of the magnet 23 and the magnet length, the position of the Hall element 13 with respect to each scale unit 20A can be calculated even when there is a plurality of scale units 20A. For example, when two scale units 20A are close to each other on the sensor unit 10, if the magnet length is not known, there is a possibility that the computation unit 30 may erroneously determine the two scale units 20A as one scale unit 20A to detect the position of the Hall element 13 with respect to the scale unit 20A. Since the computation unit 30 according to the first embodiment detects the position of the Hall element 13 with respect to the scale unit 20A based on the magnet length, the position of the Hall element 13 with respect to each scale unit 20A can be detected.

As described above, after determining between which Hall elements 13 the right end position P1 of the magnet 23 exists, the absolute position detection device 1A can calculate the positional information of the Hall element 13 with respect to the scale unit 20A based on the incremental position of the Hall element 13 facing the magnet 23.

Note that the computation unit 30 may detect the right end position P1 and the left end position of the magnet 23, and may detect the positional information of the Hall element 13 with respect to the scale unit 20A based on the right end position P1 and the left end position of the magnet 23.

Since the computation unit 30 detects the position of the magnet end using the distortion of the incremental position due to the distortion of the magnetic field at the end position of the magnet 23, the incremental difference between the Hall elements 13 can be calculated even when the scale unit 20A is not moving. Thus, even when the scale unit 20A is not moving, the computation unit 30 can calculate the positional information of the Hall element 13 with respect to the scale unit 20A.

Note that the computation unit 30 may calculate the positional information of the Hall element 13 with respect to the scale unit 20A based on the magnetic field intensity (absolute value). In this case, if the difference between the magnetic field intensity of the Hall element E(N+1) and the magnetic field intensity of the Hall element E(N) is equal to or greater than a specific value (fourth threshold), the computation unit 30 determines that the right end position P1 exists between the Hall elements E(N+1) and E(N). If the difference between the magnetic field intensity of the Hall element E(N) and the magnetic field intensity of the Hall element E(N−1) is equal to or greater than the specific value (fourth threshold), the computation unit 30 determines that the right end position P1 exists between the Hall elements E(N) and E(N−1).

For example, if the magnetic field intensity of the Hall element E(N) is zero and the magnetic field intensity of the Hall element E(N−1) is equal to or greater than the specific value, the computation unit 30 determines that the right end position P1 exists between the Hall elements E(N) and E(N−1).

In the case of calculating the positional information of the Hall element 13 with respect to the scale unit 20A based on the magnetic field intensity, the computation unit 30 uses the magnetic field intensity of the Hall element E(N+2) and the Hall element E(N−2) in order to distinguish between the right end position P1 and the left end position of the magnet 23. That is, when the magnetic field intensity of the Hall element E(N+2) is lower than the magnetic field intensity of the Hall element E(N−2), the computation unit 30 can determine that the right end position P1 exists outside the Hall element E(N). When the magnetic field intensity of the Hall element E(N−2) is lower than the magnetic field intensity of the Hall element E(N+2), the computation unit 30 may determine that the left end position exists outside the Hall element E(N).

Note that the computation unit 30 may determine between which Hall elements 13 the right end position P1 exists based on the Hall element 13 from which the incremental position has been detected and the Hall element 13 from which the incremental position has not been detected. For example, if the incremental position of the Hall element E(N+1) is zero and the incremental position of the Hall element E(N) is a specific value, the computation unit 30 determines that the right end position P1 is located between the Hall element E(N+1) and the Hall element E(N).

As described above, the absolute position detection device 1A may not dispose the Hall element 13 between adjacent detection element groups 12A as long as the interval between the adjacent detection element groups 12A is equal to or less than the length of the magnet 23 in the x direction. Therefore, the number of Hall elements 13 disposed on the upper surface of the printed circuit board 11 can be reduced. Thus, the degree of freedom in disposing the Hall elements 13 is enhanced, and the workability of the absolute position detection device 1A is improved. In addition, by increasing the number of magnetized pairs included in the magnet 23, it is possible to easily widen the interval between adjacent detection element groups 12A.

In addition, when detecting the positional information of the Hall element 13 with respect to the scale unit 20A, the absolute position detection device 1A only needs to detect one end position of the magnet 23, and does not need to detect both end positions, so that the positional information of the Hall element 13 with respect to the scale unit 20A can be easily detected. In addition, since the absolute position detection device 1A can detect the positional information of the Hall element 13 with respect to the scale unit 20A by detecting one end position of the magnet 23, the positional information of the Hall element 13 with respect to the scale unit 20A can be detected even on a movement path across a plurality of units, with one printed circuit board 11 as one unit.

In addition, since the absolute position detection device 1A can calculate the positional information of the Hall element 13 with respect to the scale unit 20A without using table information storing the correspondence relationship between the magnetic field intensity and the stroke position, the device configuration is simplified.

As described above, in the first embodiment, since the absolute position detection device 1A detects the positional information of the Hall element 13 with respect to the scale unit 20A based on the incremental difference between the Hall elements 13, as long as any one end position of the magnet 23 exists in the detection element group 12A, the positional information of the Hall element 13 with respect to the scale unit 20A can be detected. Therefore, the interval between adjacent detection element groups 12A can be increased, and thus the positional relationship between the mover 72 and the stator 71 can be detected with fewer Hall elements 13.

The absolute position detection device 1A according to the first embodiment selects the reference Hall element in step S100 in the process of calculating the positional relationship between the mover 72 and the stator 71, but if the Hall element 13 to be the reference Hall element is determined in advance, the process of step S100 may be skipped. For example, among two Hall elements 13 between which the boundary line of magnetic field distortion in the magnet 23 or the end position of the magnet 23 is determined to exist, the absolute position detection device 1A may set, as the reference Hall element, one of the two Hall elements 13 that does not include the distortion of the magnetic field in the value of the incremental position detected by the Hall element 13.

In the process of calculating the positional relationship between the mover 72 and the stator 71, the absolute position detection device 1A according to the first embodiment selects the function of calculating the position of the Hall element 13 with respect to the end position of the magnet 23 using the process of steps S100 to S102. However, the reference Hall element and the function of calculating the position of the Hall element 13 with respect the end position of the magnet 23 may be determined in advance. In this case, the absolute position detection device 1A can skip the process of steps S100 to S102.

Second Embodiment

Next, the second embodiment will be described with reference to FIGS. 7 to 12. In the second embodiment, the inter-element distance DA and the magnetization pitch DB have different lengths.

The absolute position detection device 1B according to the second embodiment has the same configuration as the absolute position detection device 1A except that the relationship between the inter-element distance DA and the magnetization pitch DB is different from that of the absolute position detection device 1A.

Figure 7:
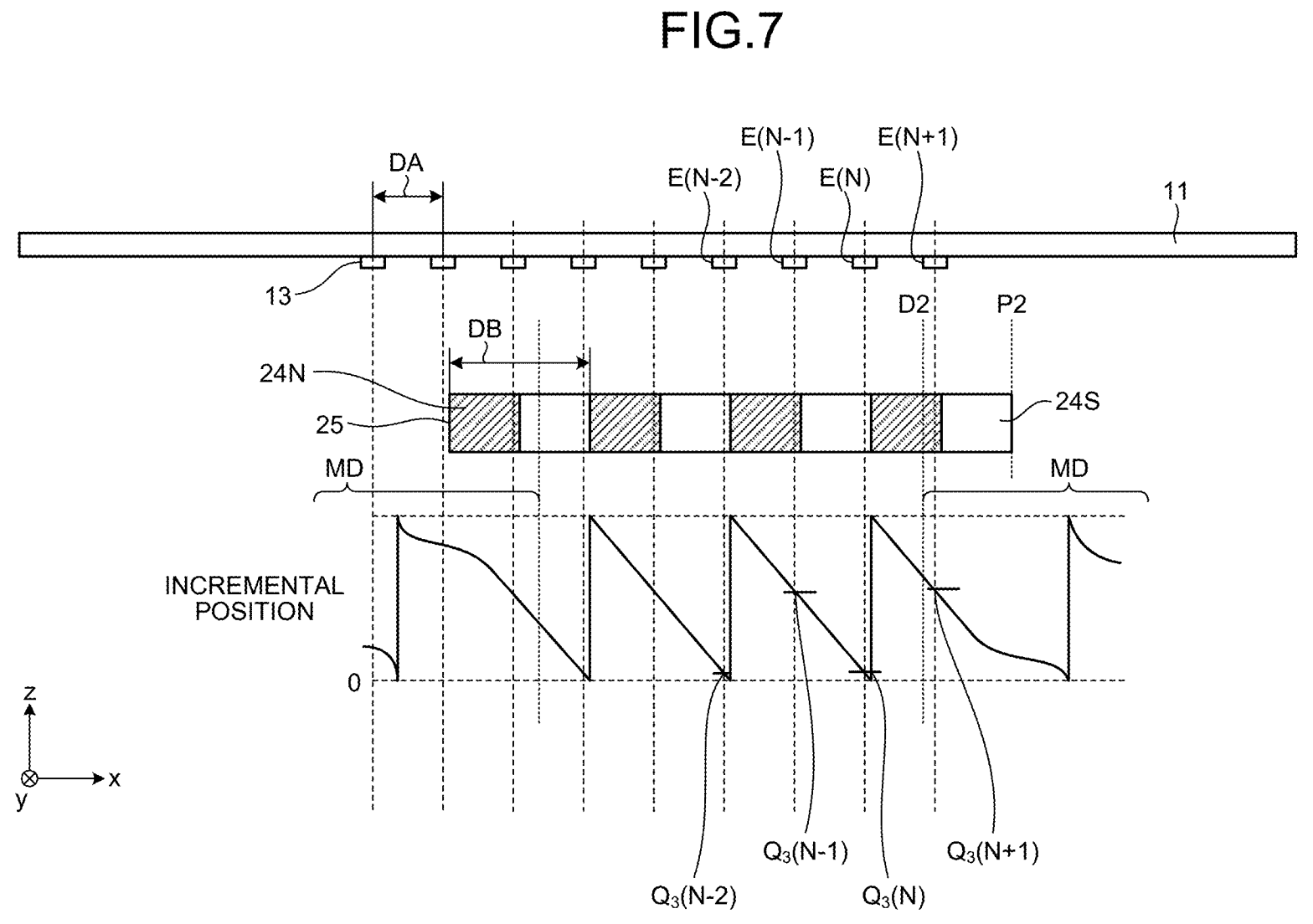
Figure 8:
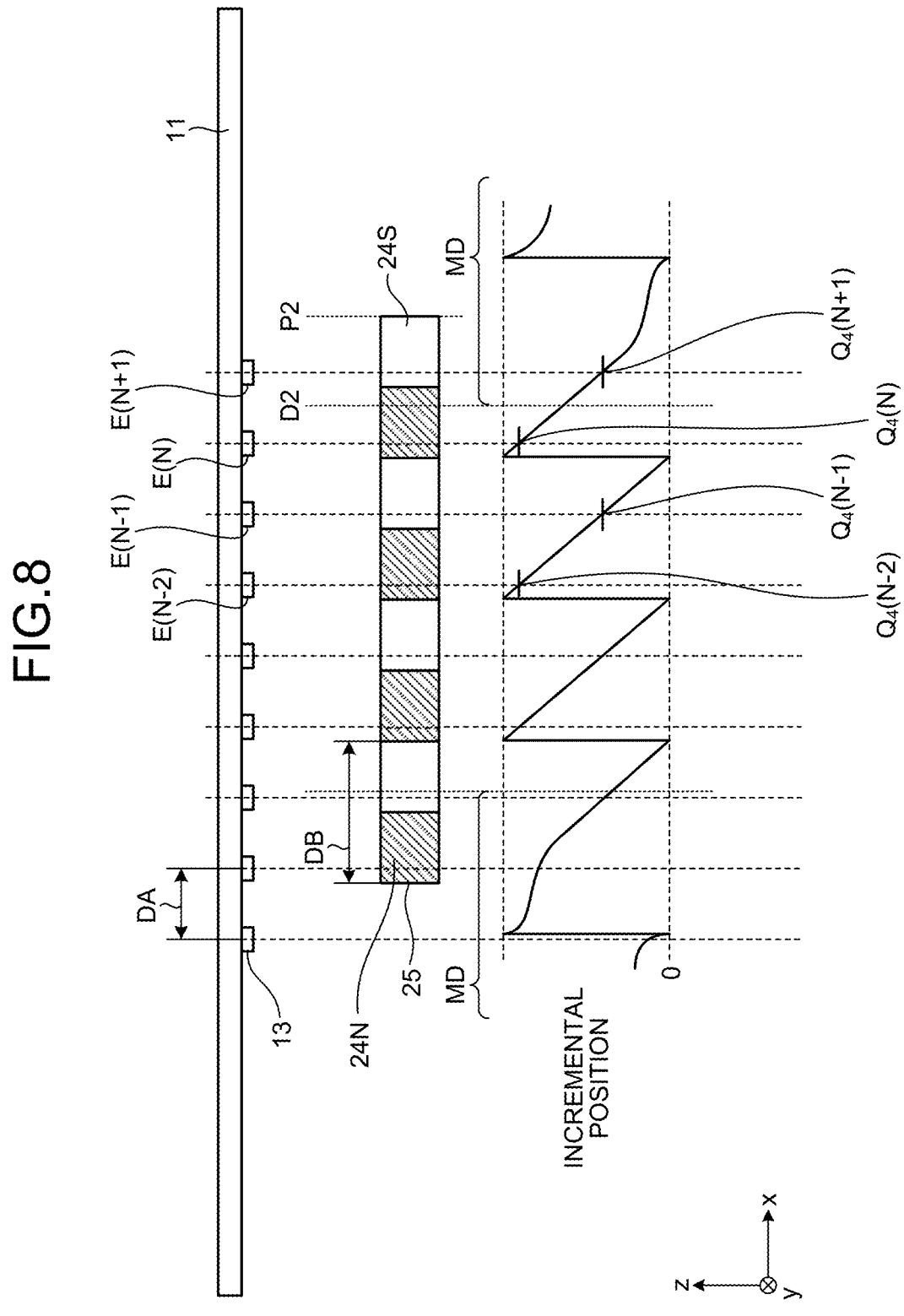
FIG. 8 is a second diagram for explaining the relationship between the scale unit and the magnetic field intensity in the absolute position detection device according to the second embodiment.
Figure 9:
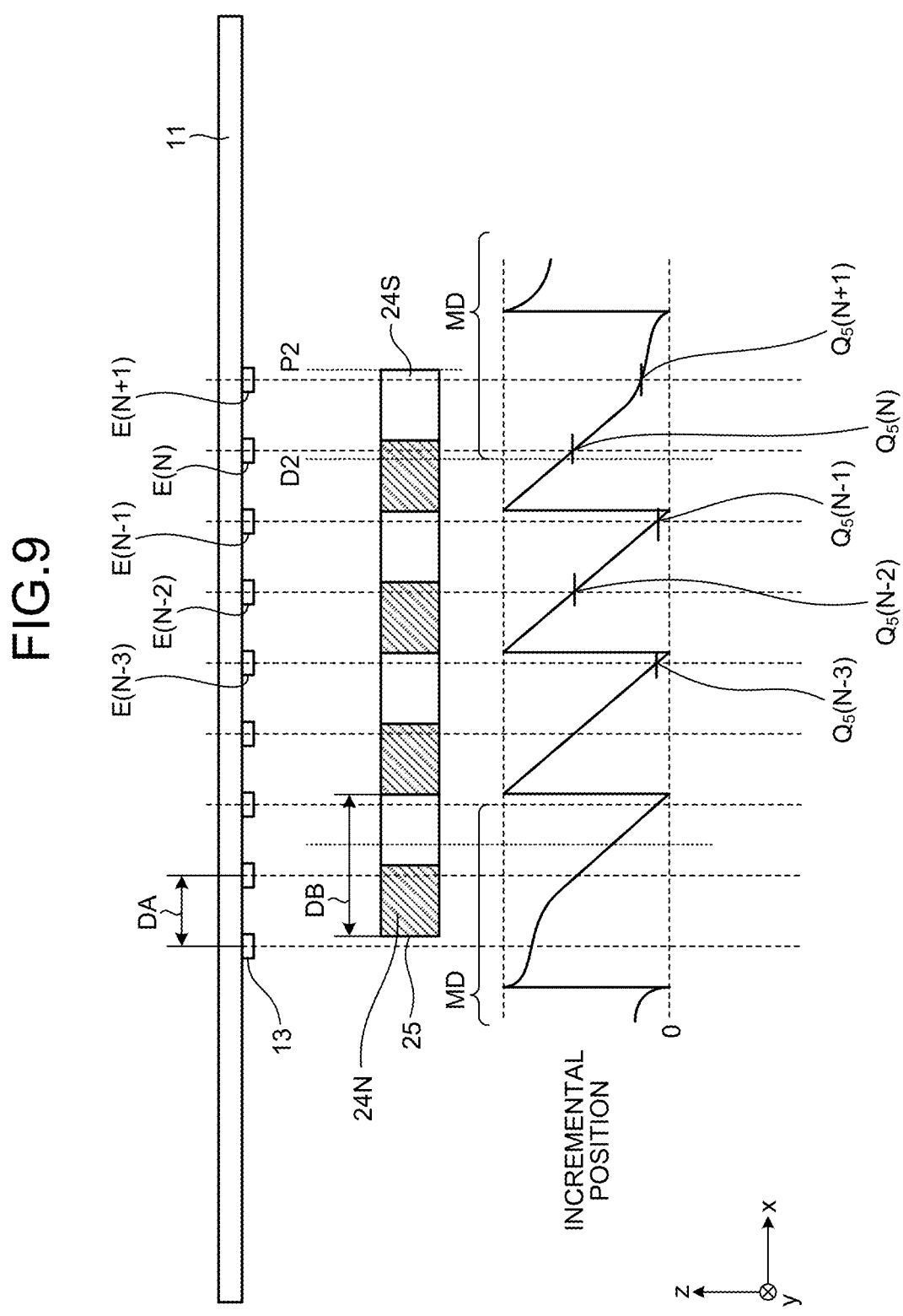
FIG. 9 is a third diagram for explaining the relationship between the scale unit and the magnetic field intensity of the absolute position detection device according to the second embodiment.
Figure 10:
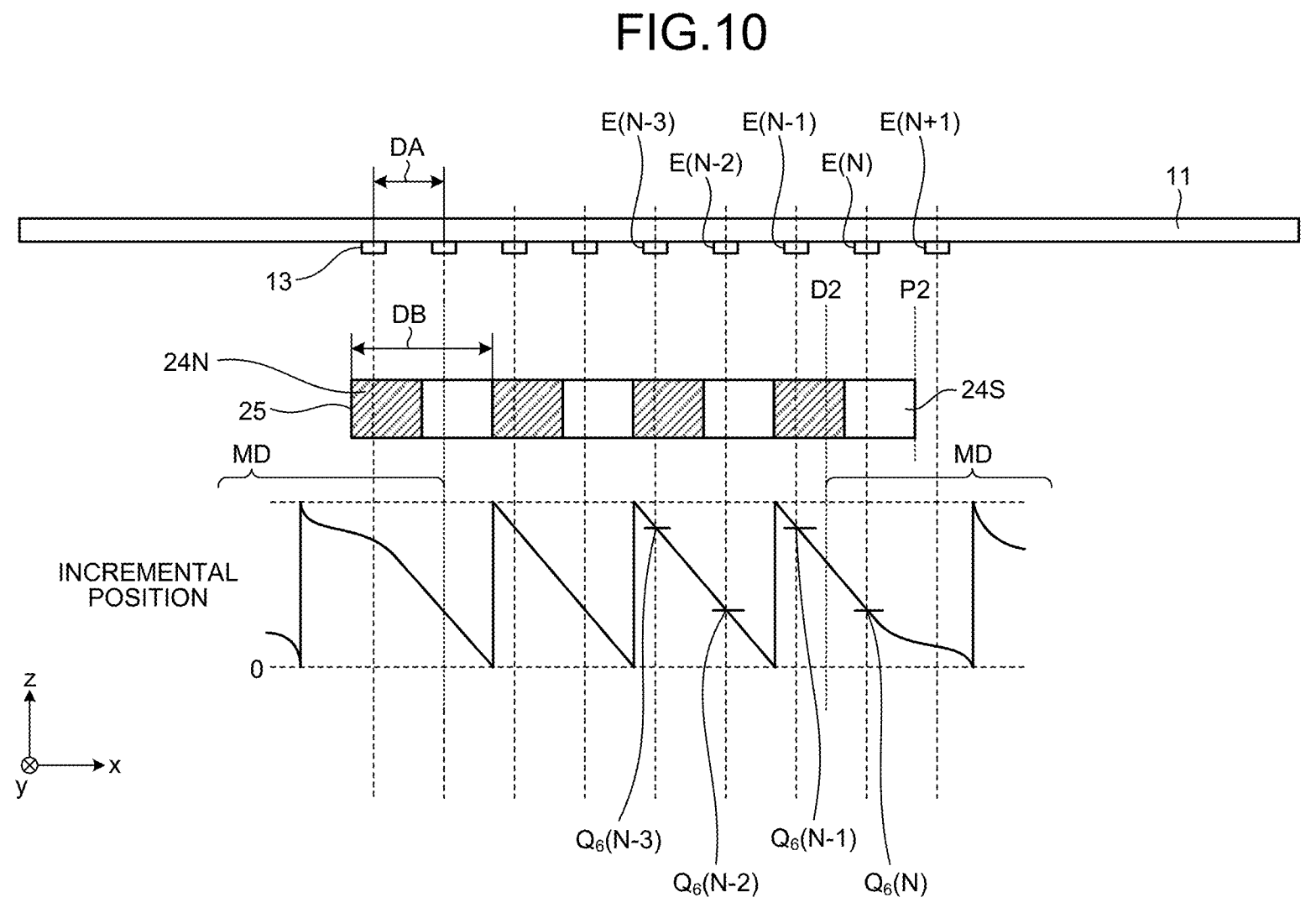

FIG. 7 is a first diagram for explaining the relationship between the scale unit and the magnetic field intensity in the absolute position detection device according to the second embodiment. FIG. 8 is a second diagram for explaining the relationship between the scale unit and the magnetic field intensity in the absolute position detection device according to the second embodiment. FIG. 9 is a third diagram for explaining the relationship between the scale unit and the magnetic field intensity of the absolute position detection device according to the second embodiment. FIG. 10 is a fourth diagram for explaining the relationship between the scale unit and the magnetic field intensity in the absolute position detection device according to the second embodiment. Components illustrated in FIGS. 7 to 10 that achieve the same functions as those of the absolute position detection device 1A according to the first embodiment illustrated in FIG. 3 are denoted by the same reference signs, and duplicate descriptions are omitted.

FIGS. 7 to 10 are side views of an absolute position detection system 100B. FIGS. 7 to 10 are side views of the printed circuit board 11 and a magnet 25. In FIGS. 7 to 10, the magnet 25 is illustrated on the lower side of the printed circuit board 11 for convenience of explanation, but the magnet 25 moves above the upper side of the printed circuit board 11. In addition, FIGS. 7 to 10 illustrate the magnetic field intensity of the magnetic force generated by a scale unit 20B. In FIGS. 7 to 10, the plus x direction is the right direction, and the minus x direction is the left direction.

The absolute position detection system 100B includes the absolute position detection device 1B and a movement mechanism. The movement mechanism of the absolute position detection system 100B includes the stator 71 and the mover 72.

Compared with the absolute position detection device 1A, the absolute position detection device 1B includes the scale unit 20B instead of the scale unit 20A. Compared with the scale unit 20A, the scale unit 20B includes the magnet 25 instead of the magnet 23. In the magnet 25, N-pole magnets 24N and S-pole magnets 24S are alternately disposed in the x direction. In the second embodiment, the magnet 25 is a first member for use in position detection.

In the absolute position detection device 1B, the magnetization pitch DB of one magnetized pair consisting of one N-pole magnet 24N and one S-pole magnet 24S is twice the inter-element distance DA. That is, the x-directional dimension of the N-pole magnet 24N is twice the x-directional dimension of the N-pole magnet 22N described in the first embodiment above. The x-directional dimension of the S-pole magnet 24S is twice the x-directional dimension of the S-pole magnet 22S described in the first embodiment above.

The second embodiment describes a case where the magnetization pitch DB is twice the inter-element distance DA, but the magnetization pitch DB may have any length that is longer than the inter-element distance DA.

FIGS. 7 to 10 illustrate cases where the positions of the right end position P2 of the magnet 25 of the scale unit 20B in the absolute position detection device 1B are different from each other. In the second embodiment, the absolute position detection device 1B detects the magnetic field intensity and the incremental position using the same process as the absolute position detection device 1A.

In FIGS. 7 to 10, the N-th (N is a natural number) Hall element 13 is referred to as the Hall element E(N). In FIGS. 7 to 10, among the Hall elements 13 included in the detection element group 12A in which the scale unit 20B is located, the seventh Hall element 13 from the left is the Hall element E(N−1). The eight Hall element 13 from the left is the Hall element E(N), and the ninth Hall element 13 from the left is the Hall element E(N+1).

FIG. 7 illustrates a state of the scale unit 20B in which, on the second detection element group 12A from the right among the three detection element groups 12A, the right end position P2 of the magnet 25 has passed to the ninth Hall element E(N+1) from the left. FIG. 7 also illustrates a state in which the entire N-pole magnet 24N among the S-pole magnet 24S and the N-pole magnet 24N constituting one magnetized pair has passed to the eighth Hall element E(N) from the left.

FIG. 8 illustrates a state of the scale unit 20B in which, on the second detection element group 12A from the right among the three detection element groups 12A, the right end position P2 of the magnet 25 has passed to the ninth Hall element E(N+1) from the left. However, FIG. 8 is different from FIG. 7 in that the entire N-pole magnet 24N among the S-pole magnet 24S and the N-pole magnet 24N constituting one magnetized pair has not passed through the eighth Hall element E(N) from the left.

FIG. 9 illustrates a state of the scale unit 20B in which on the second detection element group 12A from the right among the three detection element groups 12A, the right end position P2 of the magnet 25 has reached the ninth Hall element E(N+1) from the left.

FIG. 10 illustrates a state of the scale unit 20B in which on the second detection element group 12A from the right among the three detection element groups 12A, the right end position P2 of the magnet 25 has passed to the eighth Hall element E(N) from the left. Thereafter, the scale unit 20B further moves, and the right end position P2 of the magnet 25 reaches the ninth Hall element E(N+1).

FIGS. 7 to 10 illustrate the locus of the value of the incremental position for explaining the incremental position calculated by the absolute position detection device 1B according to the second embodiment. In FIG. 7, the values of the incremental positions at the Hall elements E(N−1), E(N), and E(N+1) are denoted by $Q_3(N-1)$, $Q_3(N)$, and $Q_3(N+1)$. In FIG. 8, the values of the incremental positions at the Hall elements E(N−1), E(N), and E(N+1) are denoted by $Q_4(N-1)$, $Q_4(N)$, and $Q_4(N+1)$. In FIG. 9, the values of the incremental positions at the Hall elements E(N−2), E(N−1), E(N), and E(N+1) are denoted by $Q_5(N-2)$, $Q_5(N-1)$, $Q_5(N)$, and $Q_5(N+1)$. In FIG. 10, the values of the incremental positions at the Hall elements E(N−2), E(N−1), and E(N) are denoted by $Q_6(N-2)$, $Q_6(N-1)$, and $Q_6(N)$. In FIGS. 7 to 10, the horizontal axis represents the position x of the magnet 25, and the vertical axis represents the incremental position.

The maximum value of the value of the incremental position of each Hall element 13 corresponds to the magnetization pitch DB. The waveform of the incremental position is a triangular wave of a right triangle. For example, given that the magnetization pitch DB is 20 mm, the value of the incremental position indicated by the vertex (or top) of one triangular wave is 20 mm.

As illustrated in FIG. 7, when the right end position of the magnet 25 is the right end position P2 in FIG. 7, the Hall element E(N−1) and the Hall element E(N) detect information corresponding to the magnetic field intensity of the second magnetized pair. The Hall element E(N+1) detects information corresponding to the magnetic field intensity of the first magnetized pair.

As illustrated in FIG. 8, when the right end position of the magnet 25 is the right end position P2 in FIG. 8, the Hall element E(N−1) detects information corresponding to the magnetic field intensity of the second magnetized pair. The Hall element E(N) and the Hall element E(N+1) detect information corresponding to the magnetic field intensity of the first magnetized pair. Further, the Hall element E(N+1) detects information corresponding to the magnetic field intensity of the first magnetized pair; the information corresponding to the magnetic field intensity of the first magnetized pair also includes information corresponding to the magnetic field intensity of the magnetic field distorted at the x-directional end of the magnet 25.

As illustrated in FIG. 9, when the right end position of the magnet 25 is the right end position P2 in FIG. 9, the Hall element E(N−2) and the Hall element E(N−1) detect information corresponding to the magnetic field intensity of the second magnetized pair. The Hall element E(N) and the Hall element E(N+1) detect information corresponding to the magnetic field intensity of the first magnetized pair. Further, the Hall element E(N+1) detects information corresponding to the magnetic field intensity of the first magnetized pair; the information corresponding to the magnetic field intensity of the first magnetized pair also includes information corresponding to the magnetic field intensity of the magnetic field distorted at the x-directional end of the magnet 25.

As illustrated in FIG. 10, when the right end position of the magnet 25 is the right end position P2 in FIG. 10, the Hall element E(N−2) detects information corresponding to the magnetic field intensity of the second magnetized pair. The Hall element E(N−1) and the Hall element E(N) detect information corresponding to the magnetic field intensity of the first magnetized pair. Here, the Hall element E(N) detects information corresponding to the magnetic field intensity of the first magnetized pair; the information corresponding to the magnetic field intensity of the first magnetized pair also includes information corresponding to the magnetic field intensity of the magnetic field distorted at the x-directional end of the magnet 25. In addition, the Hall element E(N+1) detects information corresponding to the magnetic field intensity of the magnetic field distorted at the x-directional end of the magnet 25.

In the second embodiment, the magnetization pitch DB is twice the inter-element distance DA. Therefore, the waveform of the incremental position is shifted by 180 degrees between adjacent Hall elements 13. In other words, the waveform of the incremental position is shifted by half a triangular wave between adjacent Hall elements 13. For example, the waveform of the incremental position is shifted by 180 degrees between the Hall element E(N−1) and the Hall element E(N), and the waveform of the incremental position is shifted by 180 degrees between the Hall element E(N) and the Hall element E(N+1).

If the Hall element 13 is not at a position where the distorted magnetic field of the magnet end is detected, the values of the incremental position detected by adjacent Hall element 13 differ by the value of ΔQ calculated with Formula (4) described later. On the other hand, if any of the Hall elements 13 is at a position where the distorted magnetic field of the magnet end is detected, the value of the incremental position of the Hall element 13 that detects the distorted magnetic field is different from the values of the incremental position of the other Hall elements 13 detecting the magnetic field. This is because the waveform of the incremental position at the magnet end is distorted due to the distortion of the magnetic field at the magnet end, compared to the waveforms of the other incremental positions. For all the inter-element spaces between the Hall elements 13, the computation unit 30 compares the values of the incremental position between adjacent Hall elements 13, and determines between which Hall elements 13 the boundary line of magnetic field distortion in the magnet 25 is located based on the comparison result.

The computation unit 30 can calculate the correction value of the phase difference of the incremental difference between adjacent Hall elements 13 using Formula (4) below. ΔQ in Formula (4) is the correction value of the phase difference, and $Q_{MAX}$ is the maximum value of the incremental position.

$$\Delta Q = Q_{MAX} \times (DA/DB) \qquad (4)$$

In the second embodiment, the computation unit 30 corrects the incremental difference by the correction value of ΔQ that depends on the relationship between the inter-element distance DA and the magnetization pitch DB, and determines whether the magnet end is located between the Hall elements 13 based on the corrected incremental difference.

The second embodiment is similar to the first embodiment in that for all the inter-element spaces between the Hall elements 13, the computation unit 30 compares the values of the incremental position between adjacent Hall elements 13 to determine between which Hall elements 13 the magnet end is located.

Figure 11:
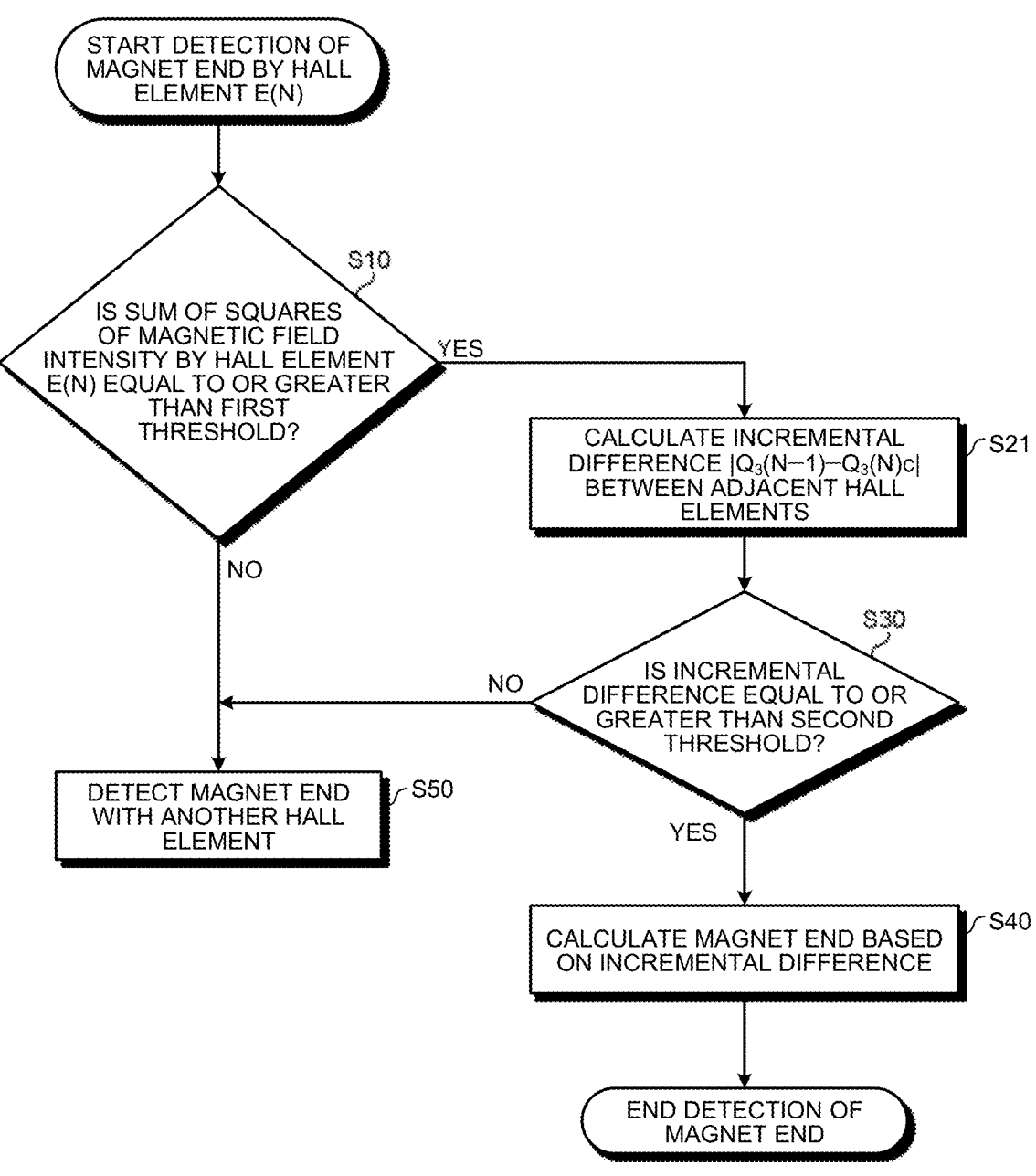
FIG. 11 is a flowchart illustrating a procedure for a process of detecting the absolute position of the scale unit by the absolute position detection device according to the second embodiment.

FIG. 11 is a flowchart illustrating a procedure for a process of detecting the absolute position of the scale unit by the absolute position detection device according to the second embodiment. Note that processes in FIG. 11 similar to the processes described with reference to FIG. 5 are not described here.

In FIG. 11, a process will be described in which the computation unit 30 detects a right end boundary line D2, which is the boundary line of magnetic field distortion in the magnet 25, for detecting the right end position P2 of the magnet 25 included in the scale unit 20B outside the Hall element E(N). That is, a process in which the computation unit 30 determines whether the right end boundary line D2 of the magnet 25 exists between the Hall element E(N−1) and the Hall element E(N) or between the Hall element E(N) and the Hall element E(N+1) will be described. Hereinafter, a case where the right end boundary line D2 exists outside the Hall element E(N), in other words, a case where the right end boundary line D1 of the magnet 23 exists between the Hall element E(N−1) and the Hall element E(N) or between the Hall element E(N) and the Hall element E(N+1) specifically means the following case (C3) or (C4).

(C3) case where the right end boundary line D2 exists between the Hall elements E(N−1) and E(N) or between the Hall elements E(N) and E(N+1)

(C4) case where the right end boundary line D2 exists at a position facing the Hall element E(N−1) or a position facing the Hall element E(N+1)

The process of steps S10 and S30 to S50 by the computation unit 30 according to the second embodiment is similar to the process of steps S10 and S30 to S50 described in FIG. 5 according to the first embodiment. The computation unit 30 according to the second embodiment executes the process of step S21 instead of step S20 described in FIG. 5 according to the first embodiment. That is, when the sum of squares of the magnetic field intensity detected by the Hall element E(N) calculated in step S10 is equal to or greater than the first threshold (step S10, Yes), the computation unit 30 calculates the incremental difference between adjacent Hall elements 13. Here, a specific description will be given using the three Hall elements E(N−1), E(N), and E(N+1) illustrated in FIG. 7 and the incremental positions $Q_3(N−1)$, $Q_3(N)$, and $Q_3(N+1)$ detected by the respective Hall elements E(N−1), E(N), and E(N+1). Regarding the three Hall elements E(N−1), E(N), and E(N+1) illustrated in FIG. 7, the description will be given on the assumption that the sum of squares of information corresponding to the magnetic field intensity detected by the Hall element E(N) is equal to or greater than the first threshold. In the absolute position detection device 1B according to the second embodiment, since the magnetization pitch DB is set to twice the inter-element distance DA, there are a case where adjacent Hall elements 13 detect information corresponding to the magnetic field intensity of the same magnetized pair and a case where adjacent Hall elements 13 detect information corresponding to the magnetic field intensity of different magnetized pairs. Therefore, in the second embodiment, in step S21, the phase is corrected using the above-described correction value $\Delta Q$ according to the relationship between the inter-element distance DA and the magnetization pitch DB. The computation unit 30 calculates the correction value $\Delta Q$ of the phase difference between adjacent Hall elements 13 using Formula (4) above.

Then, the computation unit 30 calculates the incremental difference between the incremental position $Q_3(N-1)$ of the Hall element $E(N-1)$ and the incremental position $Q_3(N)$ of the Hall element $E(N)$. When calculating this incremental difference, the computation unit 30 determines whether the Hall element $E(N-1)$ and the Hall element $E(N)$ are detecting information corresponding to the magnetic field intensity of the same magnetized pair or detecting information corresponding to the magnetic field intensity of different magnetized pairs. Specifically, the computation unit 30 detects whether a first incremental comparison value obtained by adding the correction value $\Delta Q$ to the incremental position $Q_3(N)$ is less than the maximum value $Q_{MAX}$ of the incremental position ($Q_3(N)+\Delta Q < Q_{MAX}$), or is equal to or greater than $Q_{MAX}$ ($Q_3(N)+\Delta Q \geq Q_{MAX}$). Then, if the first incremental comparison value is less than $Q_{MAX}$ ($Q_3(N)+\Delta Q < Q_{MAX}$), the computation unit 30 calculates the value of the corrected incremental position using Formula (5) below. If the first incremental comparison value is equal to or greater than $Q_{MAX}$ ($Q_3(N)+\Delta Q \geq Q_{MAX}$), the computation unit 30 calculates the value of the corrected incremental position using Formula (6) below. When calculating the incremental difference between the incremental position $Q_3(N-1)$ of the Hall element $E(N-1)$ and the incremental position $Q_3(N)$ of the Hall element $E(N)$, the computation unit 30 calculates the correction value by using, for the value Q of the incremental position in Formulas (5) and (6) below, the incremental position $Q_3(N)$ of the Hall element $E(N)$ located at the coordinates in the plus x direction among the Hall element $E(N-1)$ and the Hall element $E(N)$. After calculating the corrected incremental position $Q_3(N)$ c in the Hall element $E(N)$, the computation unit 30 calculates $|Q_3(N-1)-Q_3(N)c|$ as the incremental difference between the incremental position $Q_3(N-1)$ of the Hall element $E(N-1)$ and the incremental position $Q_3(N)$ of the Hall element $E(N)$ (step S21).

If $Q+\Delta Q < Q_{MAX}$, $$\text{corrected incremental position } Qc = Q + \Delta Q \qquad (5)$$

If $Q+\Delta Q \geq Q_{MAX}$, $$\text{corrected incremental position } Qc = Q + \Delta Q - Q_{MAX} \qquad (6)$$

Next, the computation unit 30 calculates the incremental difference between the incremental position $Q_3(N)$ of the Hall element $E(N)$ and the incremental position $Q_3(N+1)$ of the Hall element $E(N+1)$. When calculating this incremental difference, the computation unit 30 determines whether the Hall element $E(N)$ and the Hall element $E(N+1)$ are detecting information corresponding to the magnetic field intensity of the same magnetized pair or detecting information corresponding to the magnetic field intensity of different magnetized pairs as described above. When calculating the incremental difference between the incremental position $Q_3(N)$ of the Hall element $E(N)$ and the incremental position $Q_3(N+1)$ of the Hall element $E(N+1)$, the computation unit 30 calculates the correction value by using, for the value Q of the incremental position in Formulas (5) and (6) above, the incremental position $Q_3(N+1)$ of the Hall element $E(N+1)$ located at the coordinates in the plus x direction among the Hall element $E(N)$ and the Hall element $E(N+1)$. After calculating the corrected incremental position $Q_3(N+1)$ c in the Hall element $E(N+1)$, the computation unit 30 calculates $|Q_3(N)-Q_3(N+1)c|$ as the incremental difference between the incremental position $Q_3(N)$ of the Hall element $E(N)$ and the incremental position $Q_3(N+1)$ of the Hall element $E(N+1)$.

Thereafter, the computation unit 30 executes the process of steps S30 to S50. Consequently, the computation unit 30 determines between which Hall elements 13 the right end boundary line D2 exists. By determining the right end boundary line D2, the computation unit 30 can detect the position of the right end position P2 of the magnet 25 based on the information of the inter-element distance DA and the magnetization pitch DB. In addition, by determining the left end boundary line as described above, the computation unit 30 can similarly detect the existence of the left end position of the magnet 25 based on the information of the inter-element distance DA and the magnetization pitch DB. Further, the computation unit 30 calculates the positional information of the Hall element 13 with respect to the scale unit 20B using the position of the Hall element 13 with respect to the end position of the magnet 25 and the magnet length. The computation unit 30 outputs the positional information of the Hall element 13 with respect to the scale unit 20B to an external device such as a display device.

In the above description, the Hall elements $E(N-1)$, $E(N)$, and $E(N+1)$ illustrated in FIGS. 7 and $Q_3(N-1)$, $Q_3(N)$, and $Q_3(N+1)$ which are the values of the incremental positions detected by these Hall elements have been used. However, the computation unit 30 can similarly determine the right end boundary line D2 in the case of using the Hall elements $E(N-1)$, $E(N)$, and $E(N+1)$ and the values $Q_4(N-1)$, $Q_4(N)$, and $Q_4(N+1)$ of the incremental positions illustrated in FIG. 8.

In the case of the position of the magnet 25 illustrated in FIGS. 9 and 10, the Hall element 13 in which the sum of squares of the information corresponding to the magnetic field intensity is equal to or greater than the first threshold is the Hall element $E(N-1)$. In such a case, in the description on the computation unit 30, the Hall element $E(N)$ in the description using FIG. 7 shall be replaced with the Hall element $E(N-1)$, the Hall element $E(N-1)$ shall be replaced with the Hall element $E(N-2)$, and the Hall element $E(N+1)$ shall be replaced with the Hall element $E(N)$. Then, the computation unit 30 can similarly determine the right end boundary line D2 by using the values $Q_5(N-2)$, $Q_5(N-1)$, and $Q_5(N)$ of the incremental positions in FIG. 9 and the values $Q_6(N-2)$, $Q_6(N-1)$, and $Q_6(N)$ of the incremental positions in FIG. 10.

Note that $\Delta Q$ between the Hall elements $E(N-1)$ and $E(N)$ and $\Delta Q$ between the Hall elements $E(N)$ and $E(N+1)$ may have different values. When the inter-element distance DA between the Hall elements $E(N-1)$ and $E(N)$ is different from the inter-element distance DA between the Hall elements $E(N)$ and $E(N+1)$, $\Delta Q$ between the Hall elements $E(N-1)$ and $E(N)$ and $\Delta Q$ between the Hall elements $E(N)$ and $E(N+1)$ have different values.

Figure 12:
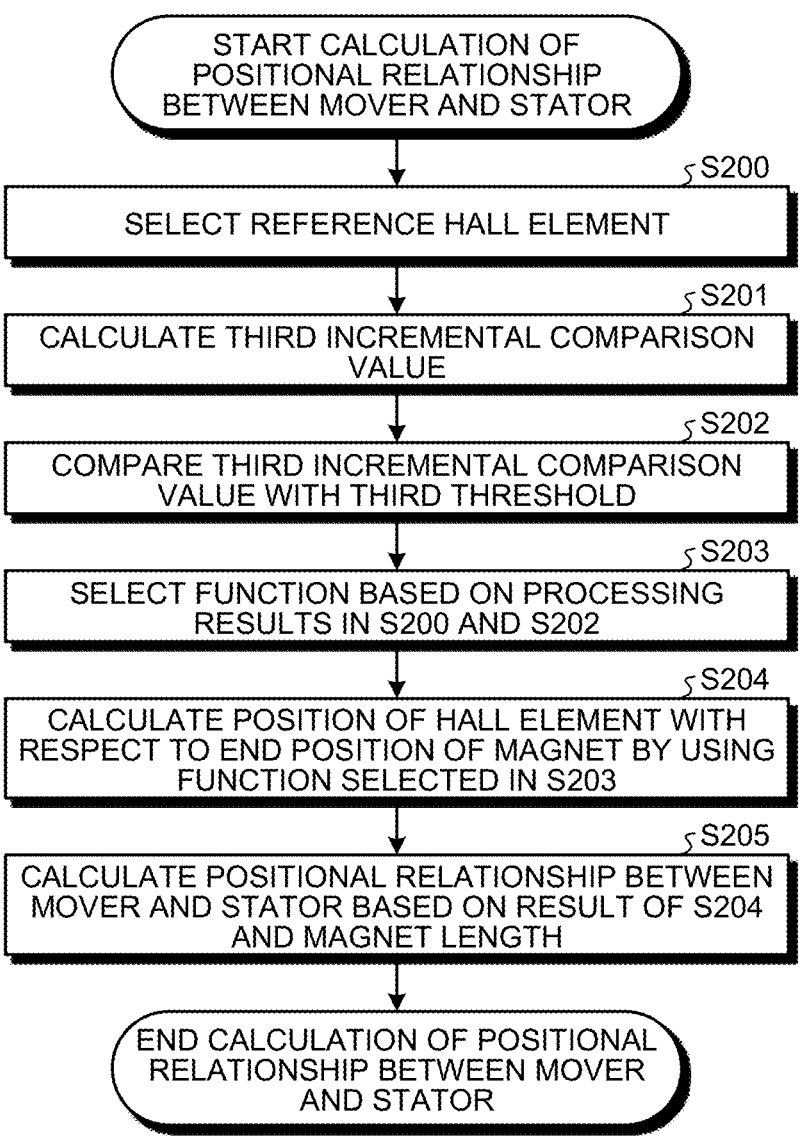
FIG. 12 is a flowchart illustrating a procedure for a process of calculating the positional relationship between the mover and the stator by the absolute position detection device according to the second embodiment.

FIG. 12 is a flowchart illustrating a procedure for a process of calculating the positional relationship between the mover and the stator by the absolute position detection device according to the second embodiment.

The computation unit 30 selects, as a reference Hall element, any one of the two Hall elements 13 between which the right end boundary line D2 of magnetic field distortion is determined to exist (step S200). The reference Hall element is an example of a reference detection element.

The computation unit 30 compares a second incremental comparison value with the maximum value $Q_{MAX}$ of the incremental position. The second incremental comparison value is obtained by adding the correction value $\Delta Q$ calculated with Formula (4) above to the value Q of the incremental position detected by the Hall element 13 corresponding to the first detection element among the three Hall elements 13 with which the boundary line of magnetic field distortion in the magnet 25 is detected. Based on the comparison result, the computation unit 30 calculates a third incremental comparison value to be compared with the third threshold in step S202 to be described later (step S201). In step S201, if the second incremental comparison value is less than $Q_{MAX}(Q+\Delta Q<Q_{MAX})$, the computation unit 30 sets Q+40 as the third incremental comparison value. If the second incremental comparison value is equal to or greater than $Q_{MAX}(Q+\Delta Q\geq Q_{MAX})$, the computation unit 30 sets Q as the third incremental comparison value.

For example, in the case of $Q_{MAX}$=20 mm and $\Delta Q$=10 mm, if Q=2 mm, $Q+\Delta Q<Q_{MAX}$ holds, and thus the computation unit 30 sets $Q+\Delta Q$ (=12 mm) as the third incremental comparison value. For example, in the case of $Q_{MAX}$=20 mm and $\Delta Q$=10 mm, if Q=12 mm, $Q+\Delta Q\geq Q_{MAX}$ holds, and thus the computation unit 30 sets Q (=12 mm) as the third incremental comparison value.

The computation unit 30 compares the third incremental comparison value calculated in step S201 with the third threshold (step S202). Here, the third threshold is a threshold set to select a function for calculating the position of the Hall element 13 with respect to the end position of the magnet 25. For example, the value of the length from the magnet end to the boundary line of magnetic field distortion in the magnet 25 may be set as the third threshold. Since the boundary line of magnetic field distortion in the magnet 25 varies depending on the magnetic field intensity generated by the magnetized pairs of the magnet 25, the third threshold may be set according to the magnetized pairs to be used. Similarly to the boundary line of magnetic field distortion in the magnet 23, the boundary line of magnetic field distortion in the magnet 25 is a portion where the magnetic field intensity distribution of the magnet 25 starts to deviate from the sine wave.

The computation unit 30 selects a function for calculating the position of the Hall element 13 with respect to the end position of the magnet 25 expressed by Formulas (7) to (9) below based on the reference Hall element selected in step S200 and the comparison result in step S202 (step S203). Formulas (7) to (9) below are formulas for calculating the position of the detection element with respect to the end position of the magnet 25 based on the value of the incremental position of the target Hall element 13, the number of the spacing from the reference Hall element, the inter-element distance DA, and the magnetization pitch DB. In step S203, the computation unit 30 checks whether the reference Hall element selected in step S200 is the Hall element 13 detecting information corresponding to the magnetic field intensity including the distortion of the magnetic field. Further, the computation unit 30 selects one of Formulas (7) to (9) below by checking whether the third incremental comparison value calculated in step S201 exceeds the third threshold. Formula (7) is selected when the value of the incremental position detected by the reference Hall element does not include the distortion of the magnetic field and the third incremental comparison value is less than the third threshold in the comparison in step S202. Formula (8) is selected when the value of the incremental position detected by the reference Hall element does not include the distortion of the magnetic field and the third incremental comparison value exceeds the third threshold in the comparison in step S202, or when the value of the incremental position detected by the reference Hall element includes the distortion of the magnetic field and the third incremental comparison value does not exceed the third threshold in the comparison in step S202. Formula (9) is selected when the value of the incremental position detected by the reference Hall element includes the distortion of the magnetic field and the third incremental comparison value exceeds the third threshold in the comparison in step S202.

$$\text{Position of Hall element } 13 = Q + DB\times((\text{the number of the spacing from reference detection element}+2)\times DA/DB) \tag{7}$$

In Formula (7), the calculation result of "(the number of the spacing from reference detection element+2)×DA/DB" is treated as an integer by omitting all decimal places.

$$\text{Position of Hall element } 13 = Q + DB\times((\text{the number of the spacing from reference detection element}+1)\times DA/DB) \tag{8}$$

In Formula (8), the calculation result of "(the number of the spacing from reference detection element+1)×DA/DB" is treated as an integer by omitting all decimal places.

$$\text{Position of Hall element } 13 = Q + DB\times((\text{the number of the spacing from reference detection element})\times DA/DB) \tag{9}$$

In Formula (9), the calculation result of "(the number of the spacing from reference detection element)×DA/DB" is treated as an integer by omitting all decimal places.

In Formulas (7) to (9) above, the position of the Hall element 13 is the position of the Hall element 13 with respect to the end position of the magnet 25. Q is the value of the incremental position detected by the Hall element 13 of which the position with respect to the end position of the magnet 25 is calculated. DA is the inter-element distance. DB is the magnetization pitch. The number of the spacing from the reference detection element indicates what number the Hall element 13 of which the position with respect to the end position of the magnet 25 is calculated is from the reference detection element. For example, taking the Hall elements 13 illustrated in FIG. 7 as an example, given that the Hall element E(N) is the reference Hall element (reference detection element), the number of the spacing of the Hall element E(N−1) and the Hall element E(N+1) from the reference detection element is "1". Similarly, the number of the spacing of the Hall element E(N−2) from the reference detection element is "2". The number of the spacing from the reference detection element at the Hall element 13 of which the position with respect to the end position of the magnet 25 is calculated can be obtained from the coordinates of each Hall element 13 stored in the storage unit 31.

The computation unit 30 calculates the position of the Hall element 13 with respect to the end position of the magnet 25 by using the function selected in step S203 from among Formulas (7) to (9) above (step S204). Specifically, the computation unit 30 receives information corresponding to the magnetic field intensity from the Hall element 13 detecting information corresponding to the magnetic field intensity among the Hall elements 13 in the detection element group 12A including the Hall element 13 that is the reference Hall element. The computation unit 30 acquires, from the storage unit 31, the coordinates of the Hall element 13 detecting the received information corresponding to the magnetic field intensity and the coordinates of the Hall element 13 that is the reference Hall element. The coordinates of the Hall element 13 that is the reference Hall element are the first element coordinates, and the coordinates of the Hall element 13 that is the third detection element among the Hall elements 13 are the second element coordinates. Furthermore, the computation unit 30 acquires the inter-element distance DA and the magnetization pitch DB from the storage unit 31.

The computation unit 30 calculates the incremental position in each Hall element 13 based on the information corresponding to the magnetic field intensity received from each Hall element 13. If the incremental position is received as the information corresponding to the magnetic field intensity, the computation unit 30 can skip the calculation of the incremental position. Then, the computation unit 30 calculates the number of the spacing of each Hall element 13 from the reference Hall element based on the acquired coordinates of the Hall elements 13. Note that the number of the spacing of each Hall element 13 from the reference Hall element can be stored in the storage unit 31 in advance, in such case the computation unit 30 can skip the calculation of the number of the spacing of each Hall element 13 from the reference Hall element.

The computation unit 30 calculates the position of the Hall element 13 with respect to the end position of the magnet 25 using the selected one of Formulas (7) to (9) based on the value of the incremental position of the target Hall element 13, the number of the spacing from the reference Hall element, the inter-element distance DA, and the magnetization pitch DB.

The computation unit 30 calculates the positional relationship between the mover 72 and the stator 71 based on the position of the Hall element 13 with respect to the end position of the magnet 25 calculated in step S204 and the length of the magnet 25 in the moving direction (step S205). In this case, the computation unit 30 acquires a value stored as the magnet length in the storage unit 31, and uses the value as the length of the magnet 25 in the moving direction.

Returning to FIGS. 7 to 10, a case where the right end position P2 exists at the position illustrated in FIGS. 7 to 10 will be described.

First, when the right end position P2 of the magnet 25 exists at the position illustrated in FIG. 7, the computation unit 30 determines that the right end boundary line D2 exists between the Hall elements E(N) and E(N+1) by using the values of the incremental positions detected by the Hall elements E(N−1), E(N), and E(N+1). Thus, the reference Hall element is either the Hall element E(N) or the Hall element E(N+1). Hereinafter, the process of calculating the positional relationship between the mover 72 and the stator 71 by the absolute position detection device 1B according to the second embodiment will be described in detail in each of the case where the reference Hall element is the Hall element E(N) and the case where the reference Hall element is the Hall element E(N+1). Here, the Hall element E(N) is the first detection element, the Hall element E(N+1) is the second detection element, and the Hall element E(N−1) and the Hall element E(N−2) are the third detection elements.

Selecting the Hall element E(N) as the reference Hall element in step S200, the computation unit 30 calculates the third incremental comparison value using the value Q(N) of the incremental position of the Hall element E(N) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N) in FIG. 7 is less than the third threshold. The Hall element E(N) does not include the magnetic field distortion in the detected value of the incremental position. Thus, the computation unit 30 selects Formula (7) in accordance with step S203.

In accordance with step S204, the computation unit 30 calculates the position of the Hall element 13 with respect to the end position of the magnet 25 using Formula (7). In step S204, the computation unit 30 calculates the position of the Hall element 13 with respect to the end position of the magnet 25 for each of the Hall elements 13 detecting information corresponding to the magnetic field intensity in the detection element group 12A including the Hall element E(N) serving as the reference Hall element. Here, calculation for the three Hall elements E(N−2), E(N−1), and E(N) will be described with a specific example. Note that the example described here assumes that the inter-element distance DA is 10 mm and the magnetization pitch DB is 20 mm.

The computation unit 30 calculates the value of the incremental position of each of the Hall elements E(N−2), E(N−1), and E(N). The computation unit 30 acquires the coordinates of the Hall elements E(N−2), E(N−1), and E(N) from the storage unit 31, and calculates the number of the spacing of each of the Hall elements E(N−2), E(N−1), and E(N) from the reference Hall element. The number of the spacing of the Hall element E(N−1) from the reference Hall element is "1", the number of the spacing of the Hall element E(N) from the reference Hall element is "0", and the number of the spacing of the Hall element E(N−2) from the reference Hall element is "2". Furthermore, the computation unit 30 acquires the inter-element distance DA and the magnetization pitch DB from the storage unit 31.

When calculating 2 mm as the value of the incremental position of the Hall element E(N), the computation unit 30 calculates the position of the Hall element E(N) with respect to the end position of the magnet 25 as "2+20×((0+2)×10/20)=22" using Formula (7). Consequently, the computation unit 30 calculates a position of 22 mm leftward from the right end position P2, which is the end position of the magnet 25, as the position of the Hall element E(N). When calculating 12 mm as the value of the incremental position of the Hall element E(N−1), the computation unit 30 calculates the position of the Hall element E(N−1) with respect to the end position of the magnet 25 using Formula (7), with which "(1+2)×10/20=1.5" is obtained and thus the decimal place is omitted. That is, the computation unit 30 calculates the position of the Hall element E(N−1) with respect to the end position of the magnet 25 as "12+20×1=32" using Formula (7). Consequently, the computation unit 30 calculates a position of 32 mm leftward from the right end position P2 as the position of the Hall element E(N−1). Then, when calculating 2 mm as the value of the incremental position of the Hall element E(N−2), the computation unit 30 calculates the position of the Hall element E(N−2) with respect to the end position of the magnet 25 as "2+20×((2+2)×10/20)=42" using Formula (7). Consequently, the computation unit 30 calculates a position of 42 mm leftward from the right end position P2 as the position of the Hall element E(N−2).

As described above, when the Hall element E(N) is selected as the reference Hall element in the case where the right end position P2 of the magnet 25 exists at the position illustrated in FIG. 7, the computation unit 30 calculates a position of 22 mm leftward from the right end position P2 as the position of the Hall element E(N) with respect to the end position of the magnet 25. In addition, the computation unit 30 calculates a position of 32 mm leftward from the right end position P2 as the position of the Hall element E(N−1) with respect to the end position of the magnet 25. In addition, the computation unit 30 calculates a position of 42 mm leftward from the right end position P2 as the position of the Hall element E(N−2) with respect to the end position of the magnet 25.

Next, a case where the right end position P2 of the magnet 25 exists at the position illustrated in FIG. 7 and the computation unit 30 selects the Hall element E(N+1) as the reference Hall element will be described.

Selecting the Hall element E(N+1) as the reference Hall element in step S200, the computation unit 30 calculates the third incremental comparison value using the value Q(N) of the incremental position of the Hall element E(N) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N) in FIG. 7 is less than the third threshold. In addition, the Hall element E(N+1) serving as the reference Hall element includes the magnetic field distortion in the detected value of the incremental position. Thus, the computation unit 30 selects Formula (8) in accordance with step S203.

In accordance with step S204, the computation unit 30 calculates the position of the Hall element 13 with respect to the end position of the magnet 25 using Formula (8). In step S204, the computation unit 30 calculates the position, with respect to the end position of the magnet 25, of each of the Hall elements 13 detecting information corresponding to the magnetic field intensity in the detection element group 12A including the Hall element E(N+1) serving as the reference Hall element. Here, calculation for the three Hall elements E(N−2), E(N−1), and E(N) will be described with a specific example. Note that the example described here assumes that the inter-element distance DA is 10 mm and the magnetization pitch DB is 20 mm.

The computation unit 30 calculates the value of the incremental position of each of the Hall elements E(N−2), E(N−1), and E(N). The computation unit 30 acquires the coordinates of the Hall elements E(N−2), E(N−1), and E(N) from the storage unit 31, and calculates the number of the spacing of each of the Hall elements E(N−2), E(N−1), and E(N) from the reference Hall element. The number of the spacing of the Hall element E(N−1) from the reference Hall element is "2", the number of the spacing of the Hall element E(N) from the reference Hall element is "1", and the number of the spacing of the Hall element E(N−2) from the reference Hall element is "3". Furthermore, the computation unit 30 acquires the inter-element distance DA and the magnetization pitch DB from the storage unit 31.

When calculating 2 mm as the value of the incremental position of the Hall element E(N), the computation unit 30 calculates the position of the Hall element E(N) with respect to the end position of the magnet 25 as "2+20×((1+1)×10/20)=22" using Formula (8). Consequently, the computation unit 30 calculates a position of 22 mm leftward from the right end position P2, which is the end position of the magnet 25, as the position of the Hall element E(N). When calculating 12 mm as the value of the incremental position of the Hall element E(N−1), the computation unit 30 calculates the position of the Hall element E(N−1) with respect to the end position of the magnet 25 using Formula (8), with which "(2+1)×10/20=1.5" is obtained and thus the decimal place is omitted. That is, the computation unit 30 calculates the position of the Hall element E(N−1) with respect to the end position of the magnet 25 as "12+20×1=32" using Formula (8). Consequently, the computation unit 30 calculates a position of 32 mm leftward from the right end position P2 as the position of the Hall element E(N−1). Then, when calculating 2 mm as the value of the incremental position of the Hall element E(N−2), the computation unit 30 calculates the position of the Hall element E(N−2) with respect to the end position of the magnet 25 as "2+20×((3+1)×10/20)=42" using Formula (8). Consequently, the computation unit 30 calculates a position of 42 mm leftward from the right end position P2 as the position of the Hall element E(N−2).

As described above, when the Hall element E(N+1) is selected as the reference Hall element in the case where the right end position P2 of the magnet 25 exists at the position illustrated in FIG. 7, the computation unit 30 calculates a position of 22 mm leftward from the right end position P2 as the position of the Hall element E(N) with respect to the end position of the magnet 25. In addition, the computation unit 30 calculates a position of 32 mm leftward from the right end position P2 as the position of the Hall element E(N−1) with respect to the end position of the magnet 25. In addition, the computation unit 30 calculates a position of 42 mm leftward from the right end position P2 as the position of the Hall element E(N−2) with respect to the end position of the magnet 25.

As described above, when the right end position P2 of the magnet 25 exists at the position illustrated in FIG. 7, the function to be used for calculating the position of the Hall element 13 with respect to the end position of the magnet 25 differs depending on the reference Hall element selected in step S200 and the result of the comparison in step S202. Here, because the right end position P2 of the magnet 25 is the same, strictly, the function to be used for calculating the position of the Hall element 13 with respect to the end position of the magnet 25 differs depending on the difference in the selected reference Hall element. However, regardless of which function is used, the computation unit 30 calculates the position of the Hall element 13 with respect to the end position of the magnet 25 based on the value of the incremental position of the target Hall element 13, the number of the spacing from the reference Hall element, and the magnetization pitch DB. Therefore, the computation unit 30 can calculate a similar result as the position of the Hall element 13 with respect to the end position of the magnet 25.

In accordance with step S205, the computation unit 30 calculates the positional information of the Hall element 13 with respect to the scale unit 20B as the positional relationship between the mover 72 and the stator 71 based on the position of the Hall element 13 with respect to the end position of the magnet 25 calculated in step S204 and the length of the magnet 25 in the moving direction.

Next, when the right end position P2 of the magnet 25 exists at the position illustrated in FIG. 8, the computation unit 30 determines that the right end boundary line D2 exists between the Hall elements E(N) and E(N+1) by using the values of the incremental positions detected by the Hall elements E(N−1), E(N), and E(N+1). Thus, the reference Hall element is either the Hall element E(N) or the Hall element E(N+1). Hereinafter, the process of calculating the positional relationship between the mover 72 and the stator 71 by the absolute position detection device 1B according to the second embodiment will be described in detail in each of the case where the reference Hall element is the Hall element E(N) and the case where the reference Hall element is the Hall element E(N+1). Here, the Hall element E(N) is the first detection element, the Hall element E(N+1) is the second detection element, and the Hall element E(N−1) and the Hall element E(N−2) are the third detection elements.

Selecting the Hall element E(N) as the reference Hall element in step S200, the computation unit 30 calculates the third incremental comparison value using the value Q(N) of the incremental position of the Hall element E(N) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N) in FIG. 8 exceeds the third threshold. The Hall element E(N) does not include the magnetic field distortion in the detected value of the incremental position. Thus, the computation unit 30 selects Formula (8) in accordance with step S203.

In accordance with step S204, the computation unit 30 calculates the position of the Hall element 13 with respect to the end position of the magnet 25 using Formula (8). In step S204, the computation unit 30 calculates the position, with respect to the end position of the magnet 25, of each of the Hall elements 13 detecting information corresponding to the magnetic field intensity in the detection element group 12A including the Hall element E(N) serving as the reference Hall element. Here, calculation for the three Hall elements E(N−2), E(N−1), and E(N) will be described with a specific example. Note that the example described here assumes that the inter-element distance DA is 10 mm and the magnetization pitch DB is 20 mm.

The computation unit 30 calculates the value of the incremental position of each of the Hall elements E(N−2), E(N−1), and E(N). The computation unit 30 acquires the coordinates of the Hall elements E(N−2), E(N−1), and E(N) from the storage unit 31, and calculates the number of the spacing of each of the Hall elements E(N−2), E(N−1), and E(N) from the reference Hall element. The number of the spacing of the Hall element E(N−1) from the reference Hall element is "1", the number of the spacing of the Hall element E(N) from the reference Hall element is "0", and the number of the spacing of the Hall element E(N−2) from the reference Hall element is "2". Furthermore, the computation unit 30 acquires the inter-element distance DA and the magnetization pitch DB from the storage unit 31.

When calculating 18 mm as the value of the incremental position of the Hall element E(N), the computation unit 30 calculates the position of the Hall element E(N) with respect to the end position of the magnet 25 using Formula (8), with which "(0+1)×10/20=0.5" is obtained and thus the decimal place is omitted. That is, the computation unit 30 calculates the position of the Hall element E(N) with respect to the end position of the magnet 25 as "18+20×0=18" using Formula (8). Consequently, the computation unit 30 calculates a position of 18 mm leftward from the right end position P2, which is the end position of the magnet 25, as the position of the Hall element E(N). When calculating 8 mm as the value of the incremental position of the Hall element E(N−1), the computation unit 30 calculates the position of the Hall element E(N−1) with respect to the end position of the magnet 25 as "8+20×((1+1)×10/20)=28" using Formula (8). Consequently, the computation unit 30 calculates a position of 28 mm leftward from the right end position P2 as the position of the Hall element E(N−1). When calculating 18 mm as the value of the incremental position of the Hall element E(N−2), the computation unit 30 calculates the position of the Hall element E(N−2) with respect to the end position of the magnet 25 using Formula (8), with which "(2+1)×10/20=1.5" is obtained and thus the decimal place is omitted. That is, the computation unit 30 calculates the position of the Hall element E(N−2) with respect to the end position of the magnet 25 as "18+20×1=38" using Formula (8). Consequently, the computation unit 30 calculates a position of 38 mm leftward from the right end position P2 as the position of the Hall element E(N−2).

As described above, when the Hall element E(N) is selected as the reference Hall element in the case where the right end position P2 of the magnet 25 exists at the position illustrated in FIG. 8, the computation unit 30 calculates a position of 18 mm leftward from the right end position P2 as the position of the Hall element E(N) with respect to the end position of the magnet 25. In addition, the computation unit 30 calculates a position of 28 mm leftward from the right end position P2 as the position of the Hall element E(N−1) with respect to the end position of the magnet 25. In addition, the computation unit 30 calculates a position of 38 mm leftward from the right end position P2 as the position of the Hall element E(N−2) with respect to the end position of the magnet 25.

Next, a case where the right end position P2 of the magnet 25 exists at the position illustrated in FIG. 8 and the computation unit 30 selects the Hall element E(N+1) as the reference Hall element will be described.

Selecting the Hall element E(N+1) as the reference Hall element in step S200, the computation unit 30 calculates the third incremental comparison value using the value Q(N) of the incremental position of the Hall element E(N) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N) in FIG. 8 exceeds the third threshold. In addition, the Hall element E(N+1) serving as the reference Hall element includes magnetic field distortion in the detected value of the incremental position. Thus, the computation unit 30 selects Formula (9) in accordance with step S203.

In accordance with step S204, the computation unit 30 calculates the position of the Hall element 13 with respect to the end position of the magnet 25 using Formula (9). In step S204, the computation unit 30 calculates the position, with respect to the end position of the magnet 25, of each of the Hall elements 13 detecting information corresponding to the magnetic field intensity in the detection element group 12A including the Hall element E(N+1) serving as the reference Hall element. Here, calculation for the three Hall elements E(N−2), E(N−1), and E(N) will be described with a specific example. Note that the example described here assumes that the inter-element distance DA is 10 mm and the magnetization pitch DB is 20 mm.

The computation unit 30 calculates the value of the incremental position of each of the Hall elements E(N−2), E(N−1), and E(N). The computation unit 30 acquires the coordinates of the Hall elements E(N−2), E(N−1), and E(N) from the storage unit 31, and calculates the number of the spacing of each of the Hall elements E(N−2), E(N−1), and E(N) from the reference Hall element. The number of the spacing of the Hall element E(N−1) from the reference Hall element is "2", the number of the spacing of the Hall element E(N) from the reference Hall element is "1", and the number of the spacing of the Hall element E(N−2) from the reference Hall element is "3". Furthermore, the computation unit 30 acquires the inter-element distance DA and the magnetization pitch DB from the storage unit 31.

When calculating 18 mm as the value of the incremental position of the Hall element E(N), the computation unit 30 calculates the position of the Hall element E(N) with respect to the end position of the magnet 25 using Formula (9), with which "1×10/20=0.5" is obtained and thus the decimal place is omitted. That is, the computation unit 30 calculates the position of the Hall element E(N) with respect to the end position of the magnet 25 as "18+20×0=18" using Formula (9). Consequently, the computation unit 30 calculates a position of 18 mm leftward from the right end position P2, which is the end position of the magnet 25, as the position of the Hall element E(N). When calculating 8 mm as the value of the incremental position of the Hall element E(N−1), the computation unit 30 calculates the position of the Hall element E(N−1) with respect to the end position of the magnet 25 as "8+20×2×10/20=28" using Formula (9). Consequently, the computation unit 30 calculates a position of 28 mm leftward from the right end position P2 as the position of the Hall element E(N−1). When calculating 18 mm as the value of the incremental position of the Hall element E(N−2), the computation unit 30 calculates the position of the Hall element E(N−2) with respect to the end position of the magnet 25 using Formula (9), with which "3×10/20=1.5" is obtained and thus the decimal place is omitted. That is, the computation unit 30 calculates the position of the Hall element E(N−2) with respect to the end position of the magnet 25 as "18+20×1=38" using Formula (9). Consequently, the computation unit 30 calculates a position of 38 mm leftward from the right end position P2 as the position of the Hall element E(N−2).

As described above, when the Hall element E(N+1) is selected as the reference Hall element in the case where the right end position P2 of the magnet 25 exists at the position illustrated in FIG. 8, the computation unit 30 calculates a position of 18 mm leftward from the right end position P2 as the position of the Hall element E(N) with respect to the end position of the magnet 25. In addition, the computation unit 30 calculates a position of 28 mm leftward from the right end position P2 as the position of the Hall element E(N−1) with respect to the end position of the magnet 25. In addition, the computation unit 30 calculates a position of 38 mm leftward from the right end position P2 as the position of the Hall element E(N−2) with respect to the end position of the magnet 25.

As described above, when the right end position P2 of the magnet 25 exists at the position illustrated in FIG. 8, the function to be used for calculating the position of the Hall element 13 with respect to the end position of the magnet 25 differs depending on the reference Hall element selected in step S200 and the result of the comparison in step S202. Here, since the right end position P2 of the magnet 25 is the same, strictly, the function to be used for calculating the position of the Hall element 13 with respect to the end position of the magnet 25 differs depending on the difference in the selected reference Hall element. However, regardless of which function is used, the computation unit 30 calculates the position of the Hall element 13 with respect to the end position of the magnet 25 based on the value of the incremental position of the target Hall element 13, the number of the spacing from the reference Hall element, and the magnetization pitch DB. Therefore, the computation unit 30 can calculate a similar result as the position of the Hall element 13 with respect to the end position of the magnet 25.

In accordance with step S205, the computation unit 30 calculates the positional information of the Hall element 13 with respect to the scale unit 20B as the positional relationship between the mover 72 and the stator 71 based on the position of the Hall element 13 with respect to the end position of the magnet 25 calculated in step S204 and the length of the magnet 25 in the moving direction.

Further, when the right end position P2 of the magnet 25 exists at the position illustrated in FIG. 9, the computation unit 30 determines that the right end boundary line D2 exists between the Hall elements E(N−1) and E(N) by using the values of the incremental positions detected by the Hall elements E(N−2), E(N−1), and E(N). Thus, the reference Hall element is either the Hall element E(N−1) or the Hall element E(N). Hereinafter, the process of calculating the positional relationship between the mover 72 and the stator 71 by the absolute position detection device 1B according to the second embodiment will be described in detail in each of the case where the reference Hall element is the Hall element E(N−1) and the case where the reference Hall element is the Hall element E(N). Here, the Hall element E(N−1) is the first detection element, the Hall element E(N) is the second detection element, and the Hall element E(N−2) and the Hall element E(N−3) are the third detection elements.

Selecting the Hall element E(N−1) as the reference Hall element in step S200, the computation unit 30 calculates the third incremental comparison value using the value Q(N−1) of the incremental position of the Hall element E(N−1) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N−1) in FIG. 9 is less than the third threshold. In addition, the Hall element E(N−1) serving as the reference Hall element does not include the magnetic field distortion in the detected value of the incremental position. Thus, the computation unit 30 selects Formula (7) in accordance with step S203.

In accordance with step S204, the computation unit 30 calculates the position of the Hall element 13 with respect to the end position of the magnet 25 using Formula (7). In step S204, the computation unit 30 calculates the position, with respect to the end position of the magnet 25, of each of the Hall elements 13 detecting information corresponding to the magnetic field intensity in the detection element group 12A including the Hall element E(N−1) serving as the reference Hall element. Here, calculation for the three Hall elements E(N−3), E(N−2), and E(N−1) will be described with a specific example. Note that the example described here assumes that the inter-element distance DA is 10 mm and the magnetization pitch DB is 20 mm.

The computation unit 30 calculates the value of the incremental position of each of the Hall elements E(N−3), E(N−2), and E(N−1). The computation unit 30 acquires the coordinates of the Hall elements E(N−3), E(N−2), and E(N−1) from the storage unit 31, and calculates the number of the spacing of each of the Hall elements E(N−3), E(N−2), and E(N−1) from the reference Hall element. The number of the spacing of the Hall element E(N−2) from the reference Hall element is "1", the number of the spacing of the Hall element E(N−1) from the reference Hall element is "0", and the number of the spacing of the Hall element E(N−3) from the reference Hall element is "2". Furthermore, the computation unit 30 acquires the inter-element distance DA and the magnetization pitch DB from the storage unit 31.

When calculating 2 mm as the value of the incremental position of the Hall element E(N−1), the computation unit 30 calculates the position of the Hall element E(N−1) with respect to the end position of the magnet 25 as "2+20×((0+ 2)×10/20)=22" using Formula (7). Consequently, the computation unit 30 calculates a position of 22 mm leftward from the right end position P2, which is the end position of the magnet 25, as the position of the Hall element E(N−1). When calculating 12 mm as the value of the incremental position of the Hall element E(N−2), the computation unit 30 calculates the position of the Hall element E(N−2) with respect to the end position of the magnet 25 using Formula (7), with which "(1+2)×10/20=1.5" is obtained and thus the decimal place is omitted. That is, the computation unit 30 calculates the position of the Hall element E(N−2) with respect to the end position of the magnet 25 as "12+20× 1=32" using Formula (7). Consequently, the computation unit 30 calculates a position of 32 mm leftward from the right end position P2 as the position of the Hall element E(N−2). Then, when calculating 2 mm as the value of the incremental position of the Hall element E(N−3), the computation unit 30 calculates the position of the Hall element E(N−3) with respect to the end position of the magnet 25 as "2+20×((2+2)×10/20)=42" using Formula (7).

As described above, when the Hall element E(N−1) is selected as the reference Hall element in the case where the right end position P2 of the magnet 25 exists at the position illustrated in FIG. 9, the computation unit 30 calculates a position of 22 mm leftward from the right end position P2 as the position of the Hall element E(N−1) with respect to the end position of the magnet 25. In addition, the computation unit 30 calculates a position of 32 mm leftward from the right end position P2 as the position of the Hall element E(N−2) with respect to the end position of the magnet 25. In addition, the computation unit 30 calculates a position of 42 mm leftward from the right end position P2 as the position of the Hall element E(N−3) with respect to the end position of the magnet 25.

Next, a case where the right end position P2 of the magnet 25 exists at the position illustrated in FIG. 9 and the computation unit 30 selects the Hall element E(N) as the reference Hall element will be described.

Selecting the Hall element E(N) as the reference Hall element in step S200, the computation unit 30 calculates the third incremental comparison value using the value Q(N−1) of the incremental position of the Hall element E(N−1) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N−1) in FIG. 9 is less than the third threshold. In addition, the Hall element E(N) serving as the reference Hall element includes the magnetic field distortion in the detected value of the incremental position. Thus, the computation unit 30 selects Formula (8) in accordance with step S203.

In accordance with step S204, the computation unit 30 calculates the position of the Hall element 13 with respect to the end position of the magnet 25 using Formula (8). In step S204, the computation unit 30 calculates the position, with respect to the end position of the magnet 25, of each of the Hall elements 13 detecting information corresponding to the magnetic field intensity in the detection element group 12A including the Hall element E(N) serving as the reference Hall element. Here, calculation for the three Hall elements E(N−3), E(N−2), and E(N−1) will be described with a specific example. Note that the example described here assumes that the inter-element distance DA is 10 mm and the magnetization pitch DB is 20 mm.

The computation unit 30 calculates the value of the incremental position of each of the Hall elements E(N−3), E(N−2), and E(N−1). The computation unit 30 acquires the coordinates of the Hall elements E(N−3), E(N−2), and E(N−1) from the storage unit 31, and calculates the number of the spacing of each of the Hall elements E(N−3), E(N−2), and E(N−1) from the reference Hall element. The number of the spacing of the Hall element E(N−2) from the reference Hall element is "2", the number of the spacing of the Hall element E(N−1) from the reference Hall element is "1", and the number of the spacing of the Hall element E(N−3) from the reference Hall element is "3". Furthermore, the computation unit 30 acquires the inter-element distance DA and the magnetization pitch DB from the storage unit 31.

When calculating 2 mm as the value of the incremental position of the Hall element E(N−1), the computation unit 30 calculates the position of the Hall element E(N−1) with respect to the end position of the magnet 25 as "2+20×((1+ 1)×10/20)=22" using Formula (8). Consequently, the computation unit 30 calculates a position of 22 mm leftward from the right end position P2, which is the end position of the magnet 25, as the position of the Hall element E(N−1). When calculating 12 mm as the value of the incremental position of the Hall element E(N−2), the computation unit 30 calculates the position of the Hall element E(N−2) with respect to the end position of the magnet 25 using Formula (8), with which "(2+1)×10/20=1.5" is obtained and thus the decimal place is omitted. That is, the computation unit 30 calculates the position of the Hall element E(N−2) with respect to the end position of the magnet 25 as "12+20× 1=32" using Formula (8). Consequently, the computation unit 30 calculates a position of 32 mm leftward from the right end position P2 as the position of the Hall element E(N−2). Then, when calculating 2 mm as the value of the incremental position of the Hall element E(N−3), the computation unit 30 calculates the position of the Hall element E(N−3) with respect to the end position of the magnet 25 as "2+20×((3+1)×10/20)=42" using Formula (8).

As described above, when the Hall element E(N) is selected as the reference Hall element in the case where the right end position P2 of the magnet 25 exists at the position illustrated in FIG. 9, the computation unit 30 calculates a position of 22 mm leftward from the right end position P2 as the position of the Hall element E(N−1) with respect to the end position of the magnet 25. In addition, the computation unit 30 calculates a position of 32 mm leftward from the right end position P2 as the position of the Hall element E(N−2) with respect to the end position of the magnet 25. In addition, the computation unit 30 calculates a position of 42 mm leftward from the right end position P2 as the position of the Hall element E(N−3) with respect to the end position of the magnet 25.

As described above, when the right end position P2 of the magnet 25 exists at the position illustrated in FIG. 9, the function to be used for calculating the position of the Hall element 13 with respect to the end position of the magnet 25 differs depending on the reference Hall element selected in step S200 and the result of the comparison in step S202. Here, since the right end position P2 of the magnet 25 is the same, strictly, the function to be used for calculating the position of the Hall element 13 with respect to the end position of the magnet 25 differs depending on the difference in the selected reference Hall element. However, regardless of which function is used, the computation unit 30 calculates the position of the Hall element 13 with respect to the end position of the magnet 25 based on the value of the incremental position of the target Hall element 13, the number of the spacing from the reference Hall element, and the magnetization pitch DB. Therefore, the computation unit 30 can calculate a similar result as the position of the Hall element 13 with respect to the end position of the magnet 25.

In accordance with step S205, the computation unit 30 calculates the positional information of the Hall element 13 with respect to the scale unit 20B as the positional relationship between the mover 72 and the stator 71 based on the position of the Hall element 13 with respect to the end position of the magnet 25 calculated in step S204 and the length of the magnet 25 in the moving direction.

When the right end position P2 of the magnet 25 exists at the position illustrated in FIG. 10, the computation unit 30 determines that the right end boundary line D2 exists between the Hall elements E(N−1) and E(N) by using the values of the incremental positions detected by the Hall elements E(N−2), E(N−1), and E(N). Thus, the reference Hall element is either the Hall element E(N−1) or the Hall element E(N). Hereinafter, the process of calculating the positional relationship between the mover 72 and the stator 71 by the absolute position detection device 1B according to the second embodiment will be described in detail in each of the case where the reference Hall element is the Hall element E(N−1) and the case where the reference Hall element is the Hall element E(N). Here, the Hall element E(N−1) is the first detection element, the Hall element E(N) is the second detection element, and the Hall element E(N−2) and the Hall element E(N−3) are the third detection elements.

Selecting the Hall element E(N−1) as the reference Hall element in step S200, the computation unit 30 calculates the third incremental comparison value using the value Q(N−1) of the incremental position of the Hall element E(N−1) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N−1) in FIG. 10 exceeds the third threshold. In addition, the Hall element E(N−1) serving as the reference Hall element does not include the magnetic field distortion in the detected value of the incremental position. Thus, the computation unit 30 selects Formula (8) in accordance with step S203.

In accordance with step S204, the computation unit 30 calculates the position of the Hall element 13 with respect to the end position of the magnet 25 using Formula (8). In step S204, the computation unit 30 calculates the position, with respect to the end position of the magnet 25, of each of the Hall elements 13 detecting information corresponding to the magnetic field intensity in the detection element group 12A including the Hall element E(N−1) serving as the reference Hall element. Here, calculation for the three Hall elements E(N−3), E(N−2), and E(N−1) will be described with a specific example. Note that the example described here assumes that the inter-element distance DA is 10 mm and the magnetization pitch DB is 20 mm.

The computation unit 30 calculates the value of the incremental position of each of the Hall elements E(N−3), E(N−2), and E(N−1). The computation unit 30 acquires the coordinates of the Hall elements E(N−3), E(N−2), and E(N−1) from the storage unit 31, and calculates the number of the spacing of each of the Hall elements E(N−3), E(N−2), and E(N−1) from the reference Hall element. The number of the number of the spacing of the Hall element E(N−2) from the reference Hall element is "1", the number of the spacing of the Hall element E(N−1) from the reference Hall element is "0", and the number of the spacing of the Hall element E(N−3) from the reference Hall element is "2". Furthermore, the computation unit 30 acquires the inter-element distance DA and the magnetization pitch DB from the storage unit 31.

When calculating 19 mm as the value of the incremental position of the Hall element E(N−1), the computation unit 30 calculates the position of the Hall element E(N−1) with respect to the end position of the magnet 25 using Formula (8), with which "(0+1)×10/20=0.5" is obtained and thus the decimal place is omitted. That is, the computation unit 30 calculates the position of the Hall element E(N−1) with respect to the end position of the magnet 25 as "19+20× 0=19" using Formula (8). Consequently, the computation unit 30 calculates a position of 19 mm leftward from the right end position P2, which is the end position of the magnet 25, as the position of the Hall element E(N−1). When calculating 9 mm as the value of the incremental position of the Hall element E(N−2), the computation unit 30 calculates the position of the Hall element E(N−2) with respect to the end position of the magnet 25 as "9+20×((1+ 1)×10/20)=29" using Formula (8). Consequently, the computation unit 30 calculates a position of 29 mm leftward from the right end position P2 as the position of the Hall element E(N−2). When calculating 19 mm as the value of the incremental position of the Hall element E(N−3), the computation unit 30 calculates the position of the Hall element E(N−3) with respect to the end position of the magnet 25 using Formula (8), with which "(2+1)×10/ 20=1.5" is obtained and thus the decimal place is omitted. That is, the computation unit 30 calculates the position of the Hall element E(N−3) with respect to the end position of the magnet 25 as "19+20×1=39" using Formula (8). Consequently, the computation unit 30 calculates a position of 39 mm leftward from the right end position P2 as the position of the Hall element E(N−3).

As described above, when the Hall element E(N−1) is selected as the reference Hall element in the case where the right end position P2 of the magnet 25 exists at the position illustrated in FIG. 10, the computation unit 30 calculates a position of 19 mm leftward from the right end position P2 as the position of the Hall element E(N−1) with respect to the end position of the magnet 25. In addition, the computation unit 30 calculates a position of 29 mm leftward from the right end position P2 as the position of the Hall element E(N−2) with respect to the end position of the magnet 25. In addition, the computation unit 30 calculates a position of 39 mm leftward from the right end position P2 as the position of the Hall element E(N−3) with respect to the end position of the magnet 25.

Next, a case where the right end position P2 of the magnet 25 exists at the position illustrated in FIG. 10 and the computation unit 30 selects the Hall element E(N) as the reference Hall element will be described.

Selecting the Hall element E(N) as the reference Hall element in step S200, the computation unit 30 calculates the third incremental comparison value using the value Q(N−1) of the incremental position of the Hall element E(N−1) and the correction value ΔQ in accordance with step S201. Then, the computation unit 30 compares the third incremental comparison value with the third threshold in accordance with step S202. In the second embodiment, the third threshold is set by the value of the length from the right end position P2 of the magnet 25 to the boundary line (right end boundary line D2) of magnetic field distortion in the magnet 25, and the third incremental comparison value using the incremental position detected by the Hall element E(N−1) in FIG. 10 exceeds the third threshold. In addition, the Hall element E(N) serving as the reference Hall element includes the magnetic field distortion in the detected value of the incremental position. Thus, the computation unit 30 selects Formula (9) in accordance with step S203.

In accordance with step S204, the computation unit 30 calculates the position of the Hall element 13 with respect to the end position of the magnet 25 using Formula (9). In step S204, the computation unit 30 calculates the position, with respect to the end position of the magnet 25, of each of the Hall elements 13 detecting information corresponding to the magnetic field intensity in the detection element group 12A including the Hall element E(N) serving as the reference Hall element. Here, calculation for the three Hall elements E(N−3), E(N−2), and E(N−1) will be described with a specific example. Note that the example described here assumes that the inter-element distance DA is 10 mm and the magnetization pitch DB is 20 mm.

The computation unit 30 calculates the value of the incremental position of each of the Hall elements E(N−3), E(N−2), and E(N−1). The computation unit 30 acquires the coordinates of the Hall elements E(N−3), E(N−2), and E(N−1) from the storage unit 31, and calculates the number of the spacing of each of the Hall elements E(N−3), E(N−2), and E(N−1) from the reference Hall element. The number of the spacing of the Hall element E(N−2) from the reference Hall element is "2", the number of the spacing of the Hall element E(N−1) from the reference Hall element is "1", and the number of the spacing of the Hall element E(N−3) from the reference Hall element is "3". Furthermore, the computation unit 30 acquires the inter-element distance DA and the magnetization pitch DB from the storage unit 31.

When calculating 19 mm as the value of the incremental position of the Hall element E(N−1), the computation unit 30 calculates the position of the Hall element E(N−1) with respect to the end position of the magnet 25 using Formula (9), with which "1×10/20=0.5" is obtained and thus the decimal place is omitted. That is, the computation unit 30 calculates the position of the Hall element E(N−1) with respect to the end position of the magnet 25 as "19+20× 0=19" using Formula (9). Consequently, the computation unit 30 calculates a position of 19 mm leftward from the right end position P2, which is the end position of the magnet 25, as the position of the Hall element E(N−1). When calculating 9 mm as the value of the incremental position of the Hall element E(N−2), the computation unit 30 calculates the position of the Hall element E(N−2) with respect to the end position of the magnet 25 as "9+20×(2× 10/20)=29" using Formula (9). Consequently, the computation unit 30 calculates a position of 29 mm leftward from the right end position P2 as the position of the Hall element E(N−2). When calculating 19 mm as the value of the incremental position of the Hall element E(N−3), the computation unit 30 calculates the position of the Hall element E(N−3) with respect to the end position of the magnet 25 using Formula (9), with which "3×10/20=1.5" is obtained and thus the decimal place is omitted. That is, the computation unit 30 calculates the position of the Hall element E(N−3) with respect to the end position of the magnet 25 as "19+20×1=39" using Formula (9). Consequently, the computation unit 30 calculates a position of 39 mm leftward from the right end position P2 as the position of the Hall element E(N−3).

As described above, when the Hall element E(N) is selected as the reference Hall element in the case where the right end position P2 of the magnet 25 exists at the position illustrated in FIG. 10, the computation unit 30 calculates a position of 19 mm leftward from the right end position P2 as the position of the Hall element E(N−1) with respect to the end position of the magnet 25. In addition, the computation unit 30 calculates a position of 29 mm leftward from the right end position P2 as the position of the Hall element E(N−2) with respect to the end position of the magnet 25. In addition, the computation unit 30 calculates a position of 39 mm leftward from the right end position P2 as the position of the Hall element E(N−3) with respect to the end position of the magnet 25.

As described above, when the right end position P2 of the magnet 25 exists at the position illustrated in FIG. 10, the function to be used for calculating the position of the Hall element 13 with respect to the end position of the magnet 25 differs depending on the reference Hall element selected in step S200 and the result of the comparison in step S202. Here, since the right end position P2 of the magnet 25 is the same, strictly, the function to be used for calculating the position of the Hall element 13 with respect to the end position of the magnet 25 differs depending on the difference in the selected reference Hall element. However, regardless of which function is used, the computation unit 30 calculates the position of the Hall element 13 with respect to the end position of the magnet 25 based on the value of the incremental position of the target Hall element 13, the number of the spacing from the reference Hall element, and the magnetization pitch DB. Therefore, the computation unit 30 can calculate a similar result as the position of the Hall element 13 with respect to the end position of the magnet 25.

In accordance with step S205, the computation unit 30 calculates the positional information of the Hall element 13 with respect to the scale unit 20B as the positional relationship between the mover 72 and the stator 71 based on the position of the Hall element 13 with respect to the end position of the magnet 25 calculated in step S204 and the length of the magnet 25 in the moving direction.

As described above, when the right end position P2 of the magnet 25 exists at the position illustrated in FIGS. 7 to 10, the function to be used for calculating the position of the Hall element 13 with respect to the end position of the magnet 25 differs depending on the reference Hall element selected in step S200 and the result of the comparison in step S202. However, regardless of which function is used, the computation unit 30 calculates the position of the Hall element 13 with respect to the end position of the magnet 25 based on the value of the incremental position of the target Hall element 13, the number of the spacing from the reference Hall element, the inter-element distance DA, and the magnetization pitch DB. Therefore, the computation unit 30 can calculate a similar result as the position of the Hall element 13 with respect to the end position of the magnet 25.

As described above, the absolute position detection device 1B corrects the value of the incremental position using ΔQ that depends on the relationship between the inter-element distance DA and the magnetization pitch DB, calculates the incremental difference based on the corrected value of the incremental position, and determines whether the boundary line of magnetic field distortion in the magnet is located between the Hall elements 13. Thus, the absolute position detection device 1B can obtain the same effect as the absolute position detection device 1A.

In addition, the absolute position detection device 1B can detect the absolute position of the scale unit 20B with fewer N-pole magnets 24N and S-pole magnets 24S than those of the absolute position detection device 1A.

The absolute position detection device 1B according to the second embodiment selects the reference Hall element in step S200 in the process of calculating the positional relationship between the mover 72 and the stator 71, but if the Hall element 13 to be the reference Hall element is determined in advance, step S200 may be skipped. For example, among two Hall elements 13 between which the boundary line of magnetic field distortion in the magnet 25 or the end position of the magnet 25 is determined to exist, the absolute position detection device 1B may set, as the reference Hall element, one of the Hall elements 13 that does not include the distortion of the magnetic field in the value of the incremental position detected by the Hall element 13.

In the process of calculating the positional relationship between the mover 72 and the stator 71, the absolute position detection device 1B according to the second embodiment selects the function of calculating the position of the Hall element 13 with respect to the end position of the magnet 25 using the process of steps S200 to S203. However, the reference Hall element and the function of calculating the position of the Hall element 13 with respect the end position of the magnet 25 may be determined in advance. In this case, the absolute position detection device 1B can skip the process of steps S200 to S203.

Third Embodiment

Next, the third embodiment will be described with reference to FIGS. 13 and 14. In the third embodiment, a light emitting and receiving element is used instead of the Hall element 13 and a reflector is used instead of the magnet 23 to acquire positional information such as the incremental position.

Figure 13:
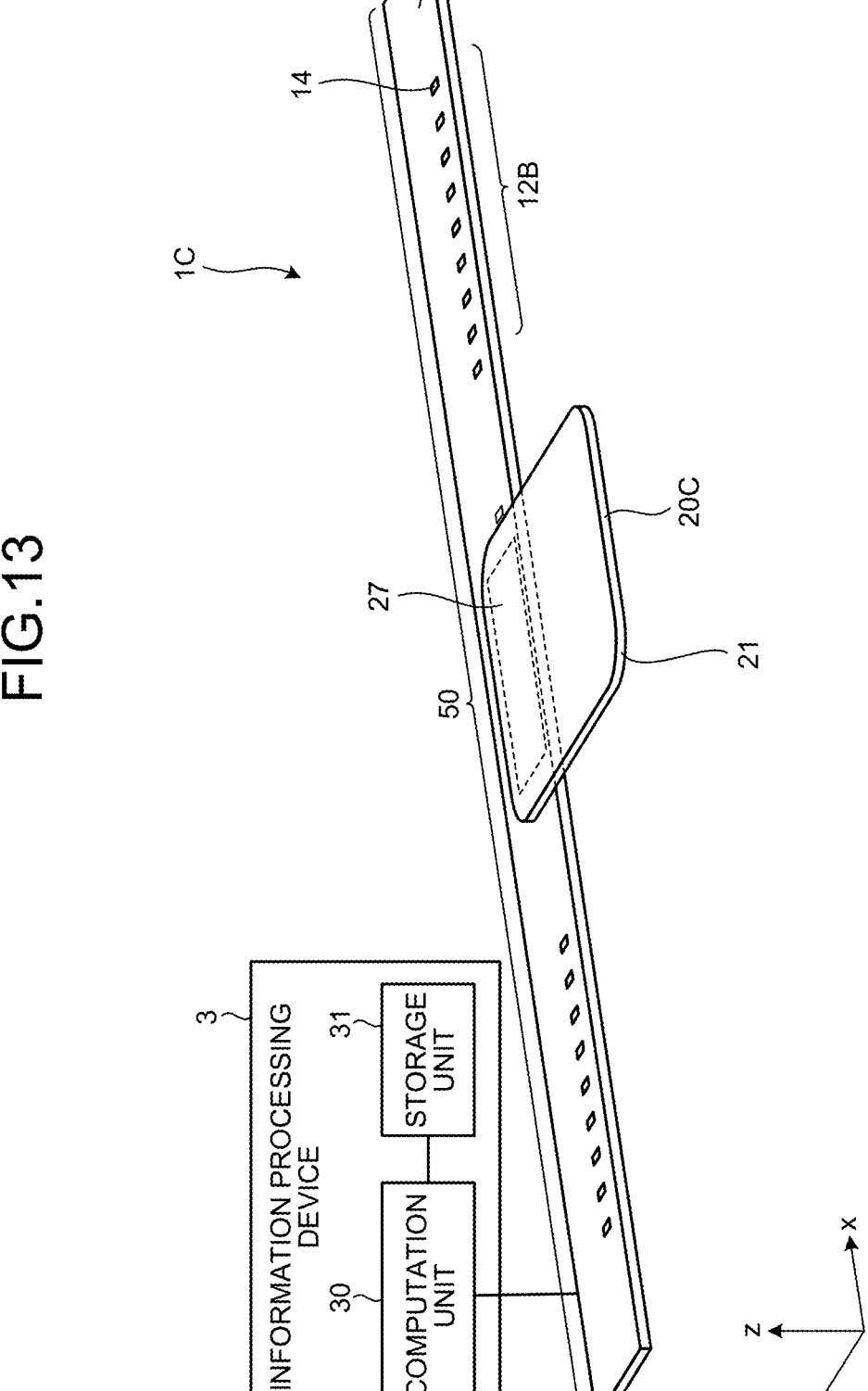
FIG. 13 is a diagram illustrating a configuration of an absolute position detection device according to the third embodiment.

FIG. 13 is a diagram illustrating a configuration of an absolute position detection device according to the third embodiment. Components illustrated in FIG. 13 that achieve the same functions as those of the absolute position detection device 1A according to the first embodiment illustrated in FIG. 1 are denoted by the same reference signs, and duplicate descriptions are omitted.

Similarly to the absolute position detection devices 1A and 1B, the absolute position detection device 1C is joined to a movement mechanism including the mover 72 and the stator 71. That is, the absolute position detection system according to the third embodiment includes the absolute position detection device 1C and the movement mechanism.

Compared with the absolute position detection device 1A, the absolute position detection device 1C includes a scale unit 20C instead of the scale unit 20A, and includes a sensor unit 50 instead of the sensor unit 10.

Compared with the sensor unit 10, the sensor unit 50 includes a detection element group 12B instead of the detection element group 12A. The detection element group 12B includes a light emitting and receiving element 14 instead of the Hall element 13. The light emitting and receiving element 14 is an element including a light receiving element and a light emitting element, and emits and receives light such as laser light. Note that the light receiving element and the light emitting element may be configured separately.

Compared with the scale unit 20A, the scale unit 20C includes a reflector 27 instead of the magnet 23. The upper surface and the bottom surface of the reflector 27 have the same size as the upper surface and the bottom surface of the magnet 23. For convenience of description, the third embodiment describes a case where a reflective part 41 and a transmissive part 42, which will be described later, are formed to the outermost end of the reflector 27 in the x direction. Thus, the outermost end of the reflector 27 in the x direction corresponds to the outermost end of the magnet 23 in the x direction. In addition, a portion of the reflector 27 where the reflective part 41 and the transmissive part 42 are formed is a first member for use in position detection.

The detection element group 12B is disposed at the same position as the detection element group 12A. Thus, the interval between the detection element group 12B and the detection element group 12B adjacent to each other on the printed circuit board 11 is equal to or less than the x-directional width of the reflector 27 included in the scale unit 20C.

Figure 14:
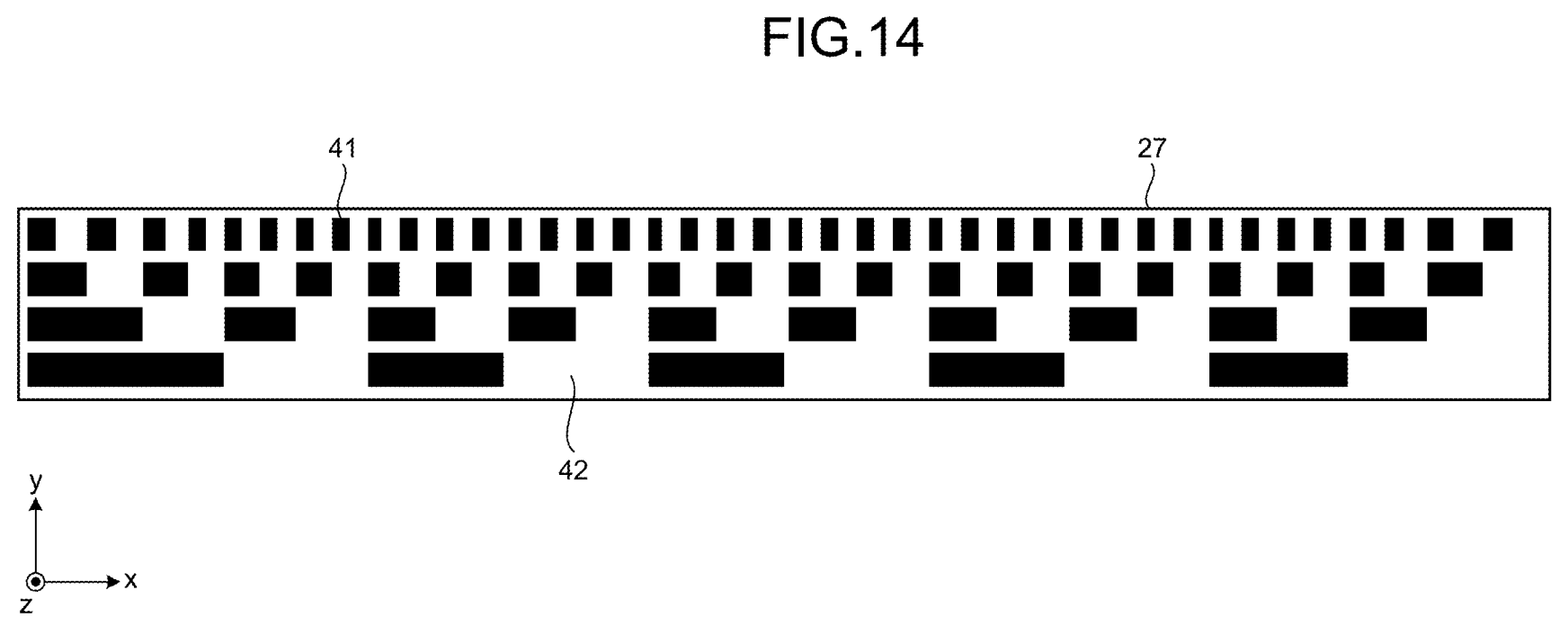

FIG. 14 is a diagram illustrating a configuration of the reflector included in the absolute position detection device according to the third embodiment. The reflector 27 includes the reflective part 41 and the transmissive part 42. In the reflector 27, a plurality of reflective parts 41 and a plurality of transmissive parts 42 are alternately disposed in the x direction. That is, the reflector 27 includes a plurality of pairs of the reflective part 41 and the transmissive part 42. That is, the reflective part 41 and the transmissive part 42 are an output pair for performing different outputs. In the reflector 27, the output pairs each for performing different outputs are disposed such that the different outputs are alternated.

Reflector length, which is the length of the reflector 27 in the x direction, is assumed to be known. The storage unit 31 stores the reflector length. In the third embodiment, the x-directional dimension of the region of the reflector 27 where the reflective part 41 and the transmissive part 42 are formed is the reflector length.

The reflector 27 includes four kinds of reflective parts 41 and four kinds of transmissive parts 42. In each stage arranged in the x direction, the x-directional dimension of the reflective part 41 and the x-directional dimension of the transmissive part 42 are the same. For example, the x-directional dimension of the reflective part 41 of the first stage arranged in the x direction is the same as the x-directional dimension of the transmissive part 42.

Assuming that the x-directional dimension of each of the reflective part 41 and the transmissive part 42 in the first stage arranged in the x direction is dimension Lx, the x-directional dimension of each of the reflective part 41 and the transmissive part 42 in the second stage arranged in the x direction is 2Lx. The x-directional dimension of each of the reflective part 41 and the transmissive part 42 in the third stage arranged in the x direction is 3Lx, and the x-directional dimension of the reflective part 41 and the transmissive part 42 in the fourth stage arranged in the x direction is 4Lx. For example, the dimension Lx corresponds to the magnetization pitch DB. Note that the reflector 27 may include three or less kinds of reflective parts 41 and transmissive parts 42, or may include five or more kinds of reflective parts 41 and transmissive parts 42.

The combination of one reflective part 41 in the reflector 27 and the transmissive part 42 adjacent to the one reflective part 41 in the x direction corresponds to a magnetized pair of the magnet 23. In other words, the combination of the transmissive part 42 and the reflective part 41 disposed adjacent to each other in the x direction corresponds to the combination of the N-pole magnet 22N and the S-pole magnet 22S. Thus, the total x-directional dimension of one transmissive part 42 and one reflective part 41 disposed adjacent to each other in the x direction corresponds to the magnetization pitch DB.

The reflector 27 can send information corresponding to the position of the reflector 27 on the printed circuit board 11 to the light emitting and receiving element 14 by letting light from the light emitting and receiving element 14 be reflected by the reflective part 41 and transmitted by the transmissive part 42. That is, in the third embodiment, the light reflected by the reflector 27 is position correspondence information that is information corresponding to the position of the reflector 27. The computation unit 30 can generate the incremental position corresponding to the position of the reflector 27 on the printed circuit board 11 by acquiring light information that is the position correspondence information from the light emitting and receiving element 14.

However, in the reflector 27, the reflective part 41 and the transmissive part 42 are configured such that the x-directional width of the reflective part 41 and the transmissive part 42 disposed in a portion close to the end of the reflector 27 is larger than the x-directional width of the reflective part 41 and the transmissive part 42 disposed in a central portion. That is, the reflective part 41 and the transmissive part 42 disposed in the portion close to the end of the reflector 27 have a distorted x-directional width as compared with the reflective part 41 and the transmissive part 42 disposed in the central portion. This distortion corresponds to the distortion of the incremental position at the magnet end.

With such a configuration, the light emitting and receiving element 14 detects information corresponding to the light intensity instead of information corresponding to the magnetic field intensity, and sends the detected information to the computation unit 30. An example of information corresponding to the light intensity is a voltage value corresponding to the light intensity.

The computation unit 30 calculates positional information of the light emitting and receiving element 14 with respect to the scale unit 20C based on the information corresponding to the light intensity from the light emitting and receiving element 14. That is, upon receiving information such as a voltage value corresponding to the light intensity, the computation unit 30 calculates the light intensity (signal intensity) based on the information and calculates the incremental position based on the light intensity.

Note that the light emitting and receiving element 14 may detect the light intensity. In this case, the computation unit 30 acquires the light intensity from each light emitting and receiving element 14 without calculating the light intensity. Alternatively, each light emitting and receiving element 14 may detect the incremental position. In this case, the computation unit 30 acquires the incremental position from each light emitting and receiving element 14 without calculating the incremental position.

The computation unit 30 according to the third embodiment determines the right end positions P1 and P2 or the left end position using a determination method similar to that of the computation unit 30 according to the first and second embodiments. For example, the computation unit 30 compares the value of the incremental position or the light intensity between adjacent light emitting and receiving elements 14, and determines between which light emitting and receiving elements 14 the end of the reflector 27 is located based on whether the difference in the value of the incremental position or the light intensity is equal to or greater than a specific value. Then, the computation unit 30 calculates the positional information of the light emitting and receiving element 14 with respect to the scale unit 20C using the position of the light emitting and receiving element 14 with respect to the end position of the reflector 27, namely the right end positions P1 and P2 or the left end position of the reflector 27, and the reflector length.

In the case of correcting the incremental difference as in the second embodiment, the computation unit 30 corrects the incremental difference by a correction value of ΔQ that depends on the relationship between the total x-directional dimension of one transmissive part 42 and one reflective part 41 disposed adjacent to each other in the x direction and the inter-element distance DA. The computation unit 30 determines whether the end of the reflector 27 is located between the light emitting and receiving elements 14 based on the corrected incremental difference.

As described above, according to the third embodiment, the absolute position detection device 1C detects the absolute position of the scale unit 20C based on the incremental difference between the light emitting and receiving elements 14, and thus can obtain the same effect as in the first embodiment.

Here, the hardware configuration of the information processing device 3 will be described. Because the information processing devices 3 according to the first to third embodiments have the same hardware configuration, the hardware configuration of the information processing device 3 according to the first embodiment will be described here.

Figure 15:
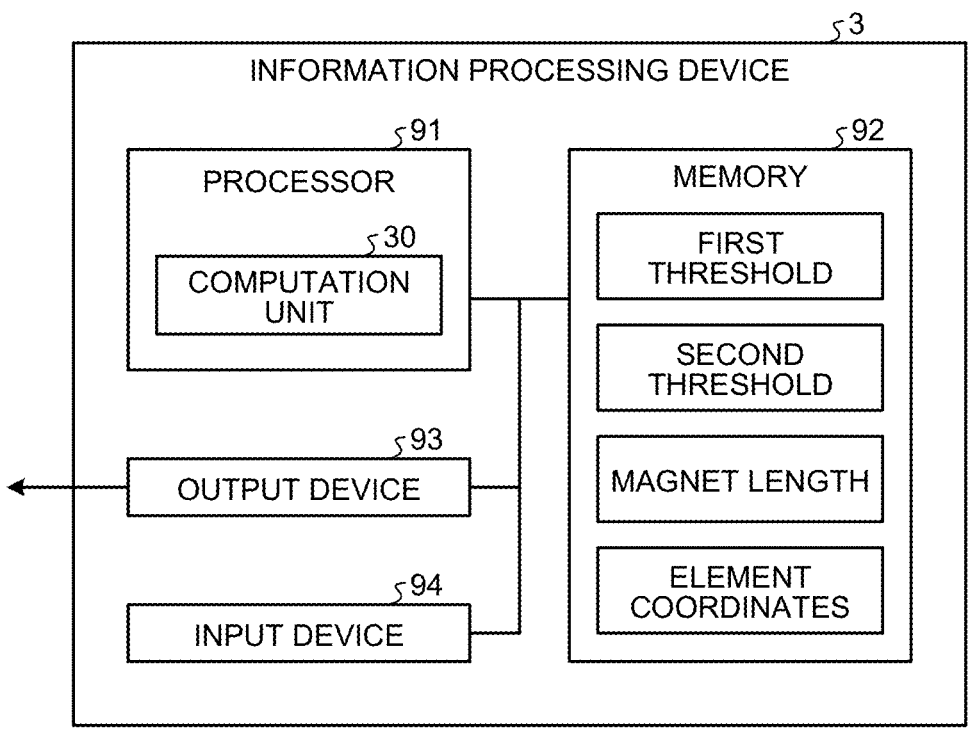
FIG. 15 is a diagram illustrating an exemplary hardware configuration for implementing the information processing device according to the first embodiment.

FIG. 15 is a diagram illustrating an exemplary hardware configuration for implementing the information processing device according to the first embodiment. The information processing device 3 can be implemented by an input device 94, a processor 91, a memory 92, and an output device 93. The processor 91 is exemplified by a central processing unit (CPU, also referred to as a central processing device, a processing device, a computation device, a microprocessor, a microcomputer, or a digital signal processor (DSP)), or a system large scale integration (LSI). The memory 92 is exemplified by a random access memory (RAM) or a read only memory (ROM). Information processing by the processor 91 corresponds to information processing by the computation unit 30.

The information processing device 3 is implemented by the processor 91 reading and executing a computer-executable computer program stored in the memory 92 for executing the operation of the information processing device 3. It can also be said that the computer program that is a program for executing the operation of information processing device 3 causes a computer to execute the procedure or method related to the information processing device 3.

The computer program to be executed by the information processing device 3 has a module configuration including the computation unit 30, which is loaded on a main storage device and generated on the main storage device.

The input device 94 receives information sent from the Hall element 13 and sends the information to the processor 91. The memory 92 stores the first threshold, second threshold, magnet length, inter-group distance DC, inter-element distance DA, magnetization pitch DB, element coordinates, i.e. coordinates of the Hall element 13, and the like. The memory 92 is also used as a temporary memory when the processor 91 executes various processes. The output device 93 outputs the positional information of the Hall element 13 with respect to the scale unit 20A calculated by the computation unit 30 to a display device or the like.

The computer program may be stored in a computer-readable storage medium in an installable or executable file and provided as a computer program product. Alternatively, the computer program may be provided to the information processing device 3 via a network such as the Internet. Note that a part of the function of the information processing device 3 may be implemented by dedicated hardware such as a dedicated circuit, and the other part may be implemented by software or firmware.

The configurations described in the above-mentioned embodiments indicate examples. The embodiments can be combined with another well-known technique and with each other, and some of the configurations can be omitted or changed in a range not departing from the gist.

REFERENCE SIGNS LIST

1A to 1C absolute position detection device; 3 information processing device; 10, 50 sensor unit; 11 printed circuit board; 12A, 12B detection element group; 13 Hall element; 14 light emitting and receiving element; 20A to 20C scale unit; 21 base material; 22N, 24N N-pole magnet; 22S, 24S S-pole magnet; 23, 25 magnet; 27 reflector; 30 computation unit; 31 storage unit; 41 reflective part; 42 transmissive part; 71 stator; 72 mover; 91 processor; 92 memory; 93 output device; 94 input device; 100A, 100B absolute position detection system.

The invention claimed is:

1. An absolute position detection device comprising:
scale circuitry having a first member in which output pairs each for performing different outputs are disposed such that the different outputs are alternated, the scale circuitry being disposed on a mover or a stator;
sensor circuitry in which detection element groups each including a plurality of detection elements disposed at a first interval in a moving direction of the scale circuitry and configured to detect position correspondence information corresponding to a position of the first member are disposed by spacing a second interval in the moving direction of the scale circuitry; and
computation circuitry to: compare a first value corresponding to the position correspondence information detected by a first detection element of the detection elements with a second value corresponding to the position correspondence information detected by a second detection element adjacent to the first detection element in the detection element group including the first detection element; detect, based on a comparison result, a distortion boundary position that is a position at which intensity distribution of the outputs starts to deviate in the moving direction; when setting either the first detection element or the second detection element used for detection of the distortion boundary position as a reference detection element, based on first element coordinates that are a position of the reference detection element in the sensor circuitry, second element coordinates that are a position, in the sensor circuitry, of a third detection element of the detection elements included in the detection element group including the reference detection element, the first interval, a third interval that is a length of the output pairs in the moving direction, and a third value corresponding to the position correspondence information detected by the third detection element, calculate a position of the third detection element with respect to an end position that is a position of an end of the first member in the moving direction; and calculate a positional relationship between the mover and the stator based on the position of the third detection element with respect to the end position and a length of the first member in the moving direction.

2. The absolute position detection device according to claim 1, wherein
the output pairs include an N-pole magnet and an S-pole magnet,
the first member is a magnet in which the N-pole magnet and the S-pole magnet are alternately disposed along the moving direction,
the detection elements detect a magnetic field intensity that depends on a position of the magnet as the position correspondence information,
the first value is a value of an incremental position corresponding to the magnetic field intensity at the first detection element, and
the second value is a value of an incremental position corresponding to the magnetic field intensity at the second detection element.

3. The absolute position detection device according to claim 1, wherein
the output pairs include an N-pole magnet and an S-pole magnet,
the first member is a magnet in which the N-pole magnet and the S-pole magnet are alternately disposed along the moving direction,
the detection elements detect information corresponding to a magnetic field intensity that depends on a position of the magnet as the position correspondence information,
the first value is a value of the magnetic field intensity at the first detection element, and
the second value is a value of the magnetic field intensity at the second detection element.

4. The absolute position detection device according to claim 1, wherein
the output pairs include a reflective part to reflect light and a transmissive part to transmit the light,
the first member is a reflector in which the reflective part and the transmissive part are alternately disposed along the moving direction,
the sensor circuitry includes a light emitting element to emit the light to the reflector,
the detection elements detect a light intensity that depends on a position of the reflector as the position correspondence information,
the first value is a value of an incremental position corresponding to the light intensity at the first detection element, and
the second value is a value of an incremental position corresponding to the light intensity at the second detection element.

5. The absolute position detection device according to claim 1, wherein
the output pairs include a reflective part to reflect light and a transmissive part to transmit the light,
the first member is a reflector in which the reflective part and the transmissive part are alternately disposed along the moving direction, the sensor circuitry includes a light emitting element to emit the light to the reflector, the detection elements detect information corresponding to a light intensity that depends on a position of the reflector as the position correspondence information, the first value is a value corresponding to the light intensity at the first detection element, and the second value is a value corresponding to the light intensity at the second detection element.

6. The absolute position detection device according to claim 1, wherein the computation circuitry determines that the end position is located in an inter-element space at which a difference between the first value and the second value is equal to or greater than a specific value among inter-element spaces between the first detection element and the second detection element.

7. The absolute position detection device according to claim 1, wherein the computation circuitry determines that the end position is located in an inter-element space at which an absolute value of a difference between the first value and the second value is equal to or greater than a specific value among inter-element spaces between the first detection element and the second detection element.

8. The absolute position detection device according to claim 2, wherein the computation circuitry determines the end position after correcting a difference between the first value and the second value with a correction value that depends on a relationship between an inter-element distance and a magnetization pitch of the magnet, the inter-element distance being a distance between the first detection element and the second detection element in the detection element group.

9. The absolute position detection device according to claim 1, wherein the second interval is equal to or less than a dimension of the first member in the moving direction, and is longer than the first interval.

10. An absolute position detection method for use in an absolute position detection device comprising:

comparing a first value with a second value, the absolute position detection device including: scale circuitry having a first member in which output pairs each for performing different outputs are disposed such that the different outputs are alternated, the scale circuitry being disposed on a mover or a stator; and sensor circuitry in which detection element groups each including a plurality of detection elements disposed at a first interval in a moving direction of the scale circuitry and configured to detect position correspondence information corresponding to a position of the first member are disposed by spacing a second interval in the moving direction of the scale circuitry, the first value corresponding to the position correspondence information detected by a first detection element of the detection elements, the second value corresponding to the position correspondence information detected by a second detection element adjacent to the first detection element in the detection element group including the first detection element;

detecting based on a comparison result, a distortion boundary position that is a position at which intensity distribution of the outputs starts to deviate in the moving direction; and when setting either the first detection element or the second detection element used for detection of the distortion boundary position as a reference detection element, based on first element coordinates that are a position of the reference detection element in the sensor circuitry, second element coordinates that are a position, in the sensor circuitry, of a third detection element of the detection elements included in the detection element group including the reference detection element, the first interval, a third interval that is a length of the output pairs in the moving direction, and a third value corresponding to the position correspondence information detected by the third detection element, calculating a position of the third detection element with respect to an end position that is a position of an end of the first member in the moving direction, and calculating a positional relationship between the mover and the stator based on the position of the third detection element with respect to the end position and a length of the first member in the moving direction.

\* \* \* \* \*